(12) United States Patent
Wang et al.

(10) Patent No.: US 6,718,092 B2
(45) Date of Patent: Apr. 6, 2004

(54) FREQUENCY DETECTION, TUNING AND STABILIZATION SYSTEM

(75) Inventors: David W. Wang, Saratoga, CA (US); John C. Tsai, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 0 days.

(21) Appl. No.: 10/143,362

(22) Filed: May 9, 2002

(65) Prior Publication Data

US 2003/0053734 A1 Mar. 20, 2003

Related U.S. Application Data

(63) Continuation-in-part of application No. 10/007,890, filed on Nov. 9, 2001, which is a continuation-in-part of application No. 09/953,468, filed on Sep. 14, 2001.

(51) Int. Cl.[7] .................................................. G02B 6/34
(52) U.S. Cl. ....................................................... 385/37
(58) Field of Search ............................. 385/37; 359/187

(56) References Cited

U.S. PATENT DOCUMENTS

| | | | |
|---|---|---|---|
| 4,474,427 A | | 10/1984 | Hill et al. |
| 4,674,100 A | * | 6/1987 | Kobayashi .................... 372/96 |
| 4,725,110 A | | 2/1988 | Glenn et al. |
| 4,807,950 A | | 2/1989 | Glenn et al. |
| 5,042,897 A | | 8/1991 | Meltz et al. |
| 5,048,913 A | | 9/1991 | Glenn et al. |
| 5,061,032 A | | 10/1991 | Meltz et al. |
| 5,104,209 A | | 4/1992 | Hill et al. |
| 5,216,739 A | | 6/1993 | Hill et al. |
| 5,305,330 A | * | 4/1994 | Rieder et al. .......... 372/29.021 |
| 5,367,588 A | | 11/1994 | Hill et al. |
| 5,388,173 A | | 2/1995 | Glenn |
| 5,495,548 A | | 2/1996 | Bilodeau et al. |
| 5,652,818 A | | 7/1997 | Byron |
| 5,822,479 A | | 10/1998 | Napier et al. |
| 5,898,804 A | | 4/1999 | Wickham |
| 6,084,998 A | | 7/2000 | Straayer |
| 6,169,831 B1 | | 1/2001 | Adams et al. |
| 6,212,312 B1 | * | 4/2001 | Grann et al. .................. 385/24 |
| 6,490,393 B1 | * | 12/2002 | Zhou ........................... 385/37 |

FOREIGN PATENT DOCUMENTS

| | | | | |
|---|---|---|---|---|
| JP | 02189529 A | * | 7/1990 | ............. G02F/3/02 |
| WO | WO 9508206 A1 | * | 3/1995 | ........... H01S/3/085 |

OTHER PUBLICATIONS

"Fiber gratings: vendors braced for the ramp–up,", Apr. 2001, vol. 2 No. 3, *FiberSystems International*, pp. 53, 54, 56 (3 pages).

* cited by examiner

*Primary Examiner*—Akm Enayet Ullah
*Assistant Examiner*—Michelle R. Connelly-Cushwa
(74) *Attorney, Agent, or Firm*—Raymond E. Roberts; IPLO Intellectual Property Law Offices

(57) ABSTRACT

A frequency processing system for detecting, tuning, or stabilizing light frequency or wavelength in a light beam produced by a light source. A grating block receives the light beam and may produce diffracted beams and a passed beam. The diffracted beams are received by respective detectors which produce measurement signals that are communicated to a processor. The processor then produces control signals that are communicated to the light source where they are usable for detecting, tuning, or stabilizing the light frequency or wavelength. The grating blocks particularly employ planar or cubical gratings, or gradient versions of these, to produce the diffracted beams.

24 Claims, 26 Drawing Sheets

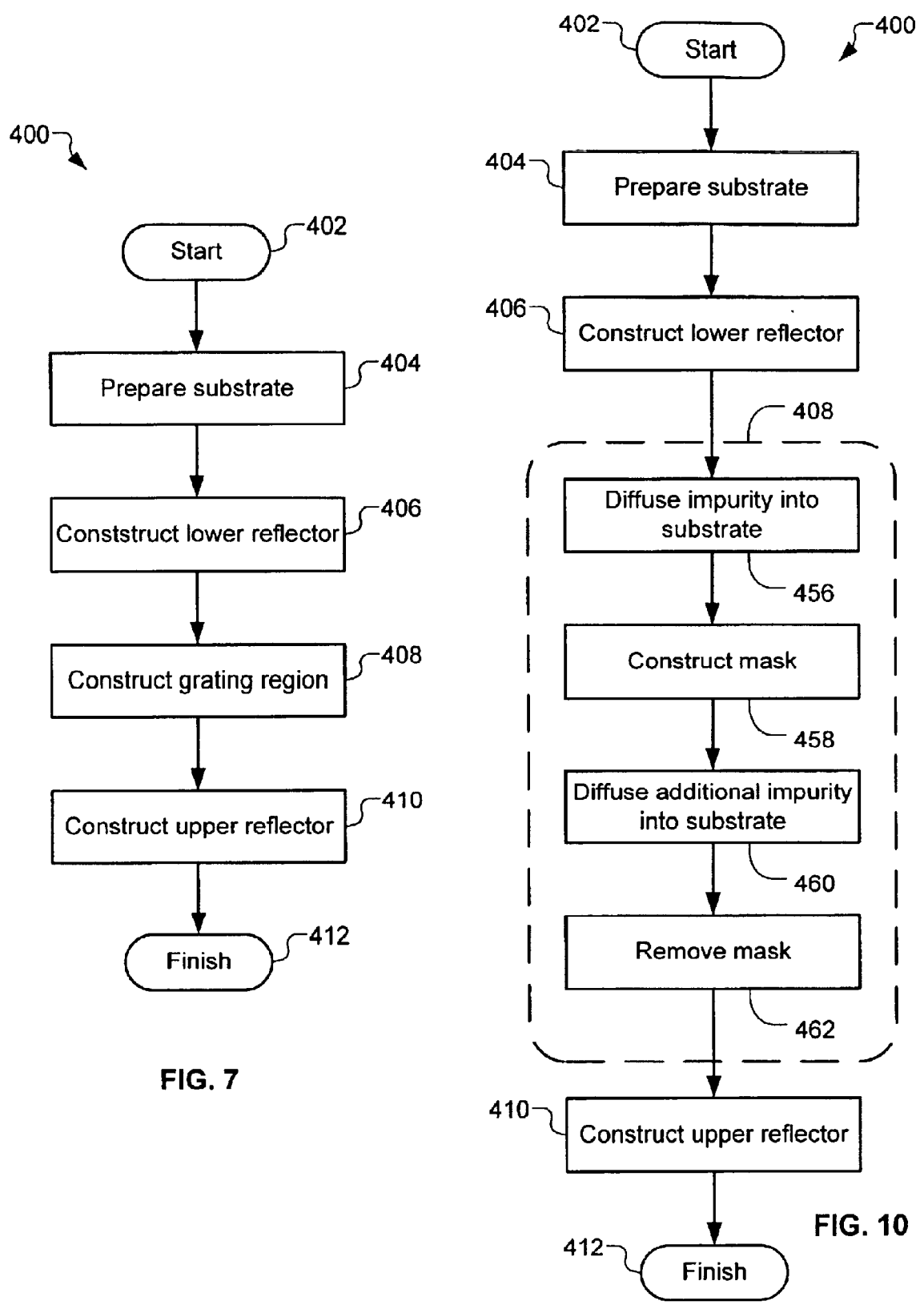

- - - - 884 ($\lambda_1$)
- - - 886 ($\lambda_2$)
——— 888 ($\lambda_3$)

FREQUENCY DETECTION, TUNING AND STABILIZATION SYSTEM

CROSS-REFERENCE TO RELATED APPLICATIONS

This is a continuation-in-part of U.S. patent application Ser. No. 10/007,890, filed Nov. 9, 2001, which in turn is a continuation-in-part of U.S. patent application Ser. No. 09/953,468, filed Sep. 14, 2001.

TECHNICAL FIELD

The present invention relates generally to light frequency or wavelength control and more particularly to using particular forms optical gratings to detect, tune, and stabilize one or more light wavelengths concurrently.

BACKGROUND ART

Optical technology is progressing rapidly. Growing needs, particularly in the telecommunications industry, are driving this progress and there is currently a major impetus to improve existing optical systems and to develop new ones. Unfortunately, many desirable capabilities are still lacking and several major components are not completely meeting requirements or expectations. These failings have resulted in high costs in existing systems and are limiting the adoption of future systems. A brief discussion of conventional optical gratings is first presented here assist in understanding their limitations as they relate to the present invention.

FIGS. 1a–b (background art) depict two variations of traditional gratings. As can be seen, the shape of the groove can vary. FIG. 1a shows square steps and FIG. 1b shows blazed triangles, but other shapes are also possible, e.g., sinusoidal shaped grooves, and the physics is essentially the same.

Such "traditional gratings" were initially made of glass with grooves, and a few are still produced in this manner today. This, however, has a number of disadvantages. For instance, the density of the grooves is limited by the capability of the ruling engine, and the quality of the grooves produced tends to decrease as elements of the ruling engine wear from usage. Production of this type of gratings is time consuming and difficult, and the cost of such gratings is therefore high.

Molded and holographic gratings were invented later on, and their production cost is significantly lower than for glass gratings. Unfortunately, although suitable for many applications, these gratings tend to deteriorate in harsh environments. For example, in fiber optic communications, all optical components must operate for long periods of time in temperatures ranging from sub-zero to over eighty degrees Centigrade, and in humidity ranging from zero to 100 percent (see e.g., GR-468-CORE, Generic Reliability Assurance Requirements for Optoelectronic Devices Used In Telecommunications Equipment).

As can also be seen in FIGS. 1a–b, traditional gratings have the property that light has to shine on the grating surface from above. This limits the useful diffraction effect of such gratings to only one dimension, and multiple units need to be assembled if multiple dimensions (axes of direction) are required.

One example of an application where the need to work with multiple wavelengths and axes is common, and growing, is wavelength division multiplexing and de-multiplexing (collectively, WDM) in fiber optic communications. The use of traditional gratings in WDM usually requires either adhesives or mechanical fixtures to keep the assembly intact. Alignment is also needed to make sure that the gratings diffract light in the proper directions. The resulting assemblies formed with such traditional gratings thus tend to be significantly larger than the optical fibers being worked with and mechanical connectors are needed for connection. All of these considerations, and others, increase the cost in a fiber optic communications system.

A relatively recent invention is the fiber Bragg grating. The fiber Bragg grating is a periodic perturbation in the refractive index which runs lengthwise in the core of a fiber waveguide. Based on the grating period, a Bragg grating reflects light within a narrow spectral band and transmits all other wavelengths which are present but outside that band. This makes Bragg gratings useful for light signal redirection, and they are now being widely used in WDM.

The typical fiber Bragg grating today is a germanium-doped optical fiber that has been exposed to ultraviolet (UV) light under a phase shift mask or grating pattern. The unmasked doped sections undergo a permanent change to a slightly higher refractive index after such exposure, resulting in an interlayer or a grating having two alternating different refractive indices. This permits characteristic and useful partial reflection to then occur when a laser beam transmits through each interlayer. The reflected beam portions form a constructive interference pattern if the period of the exposed grating meets the condition:

$$2 * \Lambda * n_{\mathit{eff}} = \lambda$$

where $\Lambda$ is the grating spacing, $n_{\mathit{eff}}$ is the effective index of refraction between the unchanged and the changed indices, and $\lambda$ is the laser light wavelength.

FIG. 2 (background art) shows the structure of a conventional fiber Bragg grating 1 according to the prior art. A grating region 2 includes an interlayer 3 having two periodically alternating different refractive indices. As a laser beam 4 passes through the interlayer 3 partial reflection occurs, in the characteristic manner described above, forming a reflected beam 5 and a passed beam 6. The reflected beam 5 thus produced will include a narrow range of wavelengths. For example, if the reflected beam 5 is that being worked with in an application, this separated narrow band of wavelengths may carry data which has been superimposed by modulation. The reflected beam 5 is stylistically shown in FIG. 2 as a plurality of parts with incidence angles purposely skewed to distinguish the reflected beam 5 from the laser beam 4. Since the reflected beam 5 is merely directed back in the direction of the original laser beam 4, additional structure is usually also needed to separate it for actual use.

Unfortunately, as already noted, conventional fiber Bragg gratings and the processes used to make them have a number of problems which it is desirable to overcome. For example, the fibers usually have to be exposed one-by-one, severely limiting mass-production. Specialized handling during manufacturing is generally necessary because the dosage of the UV exposure determines the quality of the grating produced. The orientation of the fiber is also critical, and best results are achieved when the fiber is oriented in exactly the same direction as the phase shift mask. The desired period of the Bragg grating will be deviated from if the fiber is not precisely aligned, and accomplishing this, in turn, introduces mechanical problems. Thus, merely the way that the fiber work piece is held during manufacturing may produce stresses that can cause birefringes to form in the fiber and reduce the efficiency of the end product grating.

Once in use, conventional fiber Bragg gratings may again require special handling. The thermal expansion coefficient of the base optical fiber is often significant enough that changing environmental conditions can cause the fiber to either expand or shrink to the extent that the period of the grating and its center wavelength shift.

From the preceding discussion of traditional and fiber Bragg gratings it can be appreciated that there is a need for optical gratings which are better suited to the growing range of grating applications. The parent patent applications to this one (as noted in the CROSS-REFERENCE TO RELATED APPLICATIONS section, above) introduce multidimensional optical gratings that are a considerable improvement over traditional and fiber Bragg type gratings.

In the ongoing effort to improve existing optical systems and to develop new ones, an are of particular need includes light frequency or wavelength control, i.e., detecting, tuning, and stabilizing light wavelengths. Indeed, members of the present inventors' company have been active in this field and some examples here include: U.S. patent application Ser. No. 09/798,499, filed Mar. 1, 2001 for a Light Wavelength Meter, by Tsai; U.S. patent application Ser. No. 09/798,721, filed Mar. 1, 2001 for a Light Frequency Locker, by Tsai; U.S. patent application Ser. No. 09/967,090, filed Sep. 27, 2001 for ITU Frequency/Wavelength Reference by Chen; and U.S. patent application Ser. No. 09/967,436, filed Sep. 27, 2001 for Multi-Channel Wavelength Locker Using Gas Tuning by Chen.

The noted examples and other known art for light frequency or wavelength control, however, in general and relevant part, pre-date multidimensional optical gratings and do not recognize or apply the novel characteristics of these gratings to detecting, tuning, and stabilizing light wavelengths.

DISCLOSURE OF INVENTION

Accordingly, it is an object of the present invention to provide a system for detecting, tuning, or stabilizing light frequency or wavelength.

Briefly, one preferred embodiment of the present invention is a system for processing the frequency of a light beam produced by a light source. A grating block is provided that is able to receive the light beam and emit a diffracted beam having a position based on the frequency of the light beam. The grating block includes at least one planar or cubical type grating element. A detector is then able to receive the diffracted beam, and based on its position provide a measurement signal. A processor is then able to receive the measurement signal and determine the frequency of the light beam from it to detect the frequency or wavelength of the light beam.

Briefly, another preferred embodiment of the present invention is a method for processing the frequency of a light beam produced by a light source. A first step includes receiving the light beam into a grating block having at least one planar or cubical type grating element. A subsequent step then includes emitting a diffracted beam from the grating block at a position based on the frequency of the light beam. Another step then includes detecting the position of the diffracted beam and providing a measurement signal based there on. And another step then includes processing the measurement signal to determine the frequency of the light beam, thus detecting the frequency or wavelength of the light beam.

Briefly, still another preferred embodiment of the present invention is a system for processing the frequency of a light beam produced by a light source. A grating means is provided for receiving the light beam and emitting a diffracted beam having a position based on the frequency of the light beam. The grating means includes at least one planar or cubical type grating element. A detector means then receives the diffracted beam and based on its position provides a measurement signal. A processor receives the measurement signal and determines the frequency of the light beam from it to detect the frequency or wavelength of the light beam.

Some advantages of the present invention are that it does provide an accurate, economical, robust and compact system for detecting, tuning, or stabilizing light frequency or wavelength.

The invention is particularly accurate due to its use of diffractive characteristics in planar or cubical type grating elements.

The invention is also particularly economical. In one regard, this is due to the well-known nature of semiconductor-like fabrication techniques and materials that may be used. In another regard, this is due to the invention's ability to employ multiple sets of optical characteristics concurrently, including non symmetrical or chirped characteristics. In this latter case, single embodiments the invention may serve to concurrently process multiple frequencies wherein discrete prior art systems would otherwise be required.

The invention may also be notably robust. Semiconductor-like fabrication materials are inherently robust. And when semiconductor-like fabrication techniques are used to integrate elements of the invention, potential points of weakness are removed.

The invention may also be highly compact, and it may impart this compactness to larger assemblies employing it. The invention's multiple optical characteristic capabilities, and thus its multiple or frequency or frequency range handling capabilities are one factor here, permitting fewer instances of the invention to serve than might otherwise be required. The invention's use of semiconductor-like fabrication is another factor, permitting construction of embodiments of the invention approaching and equaling the compactness of modern semiconductor devices.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which:

FIGS. 4a–p are a series of views at different stages of manufacture of one embodiment of a 1D Bragg grating, wherein:

FIG. 4a is a cross section side view of the Bragg grating as a substrate is prepared;

FIG. 4p is a cross section side view of the Bragg grating after a new transmissive layer is deposited;

FIGS. 5a–b are cross section side views depicting laser beams traveling through the finished Bragg grating of FIGS. 4a–p, wherein FIG. 5a shows how a beam will travel with minimum loss, and FIG. 5b shows how a beam will encounter constructive interference when the Bragg condition is met;

FIGS. 6a–b are cross section side views at different stages of manufacture of a second embodiment of a Bragg grating, wherein FIG. 6a shows the grating after impurities are diffused into a substrate, and FIG. 6b shows the grating after a mask has been applied and additional impurities diffused into the substrate;

FIG. 7 is a flow chart summarizing a process for creating the Bragg grating;

FIG. 10 is a flow chart showing application of the process to create the embodiment of the Bragg grating of FIGS. 6a–b;

FIGS. 22A–D are graphs depicting light wavelength verses intensity in a diffracted beam for a few possible scenarios in the frequency processing system of FIG. 21, wherein FIG. 22A represents an optimal situation, FIG. 22B represents a non optimal situation where frequency has drifted upward, FIG. 22C represents a non optimal situation where frequency has drifted, and FIG. 22D represents an extreme non optimal situation;

FIGS. 25A–I are graphs depicting some possible gradients, wherein FIG. 25A depicts no gradient variation, FIG. 25B depicts cell-to-cell separation variation along the optical path "seen" by the light beam, FIG. 25C depicts surface-to-surface separations variation instead, FIG. 25D depicts a combination of the concepts of FIGS. 25B–C, FIG. 25E depicts a refractive index of the background variation case, FIG. 25F depicts a refractive index of the cell material variation case, FIG. 25G depicts a combination of the concepts of FIGS. 25E–F, FIG. 25H depicts two sets of concurrent cell-to-cell separation variation, and FIG. 25I depicts three sets of concurrent cell-to-cell separation variation.

In the various figures of the drawings, like references are used to denote like or similar elements or steps.

BEST MODE FOR CARRYING OUT THE INVENTION

Figure 1A:
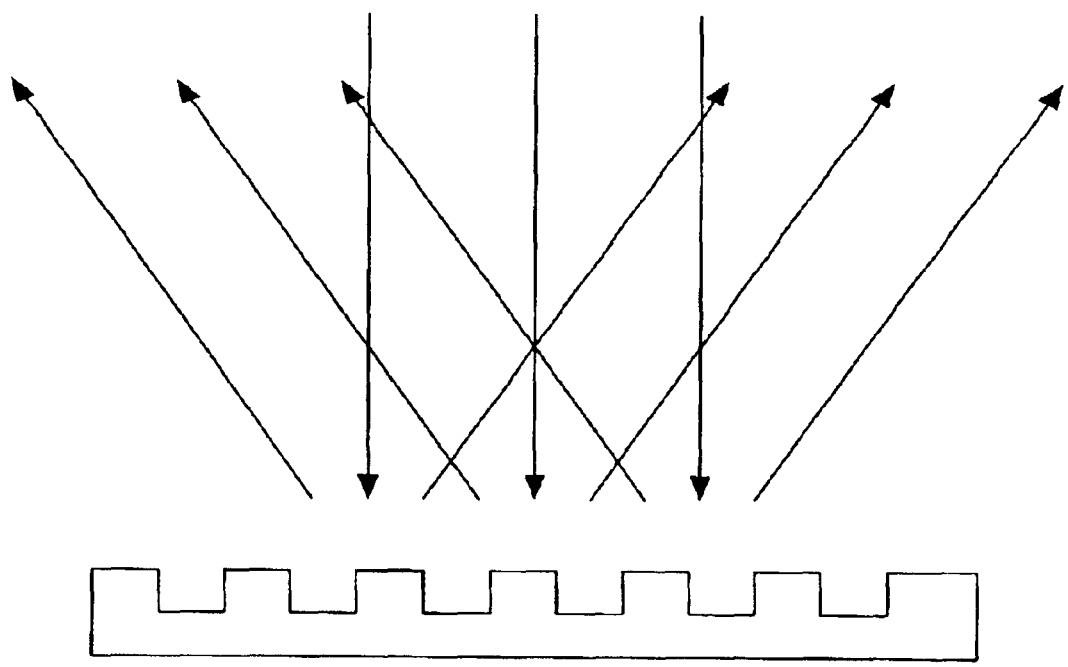
FIGS. 1a–b (background art) are cross sectional views of two traditional gratings, with depictions of light beams arriving incident to and being redirected by the gratings.
Figure 1B:
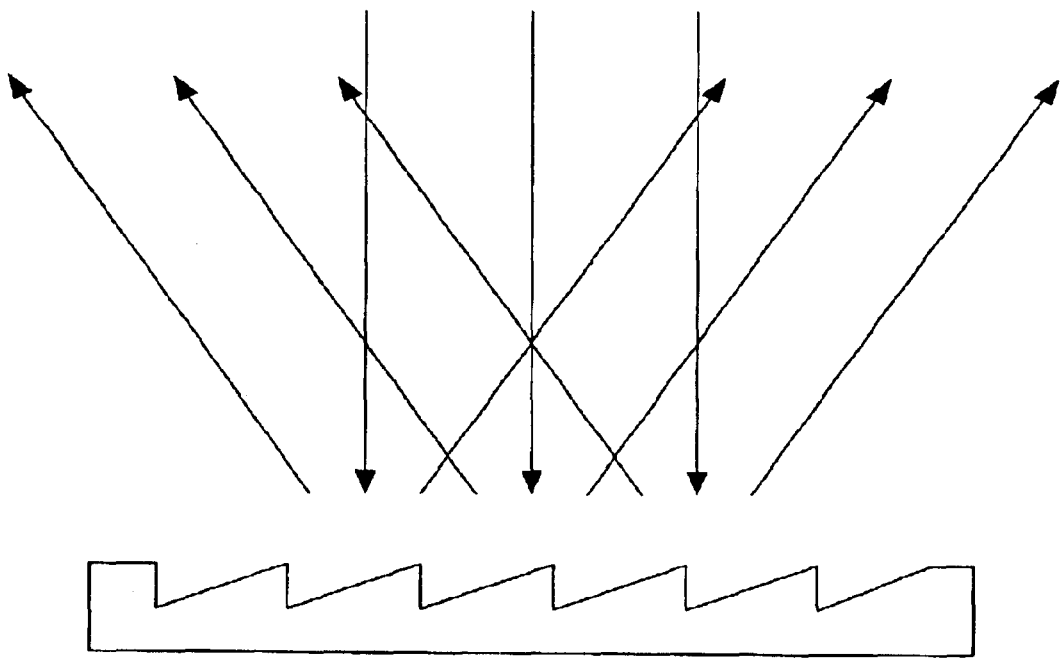
Figure 2:
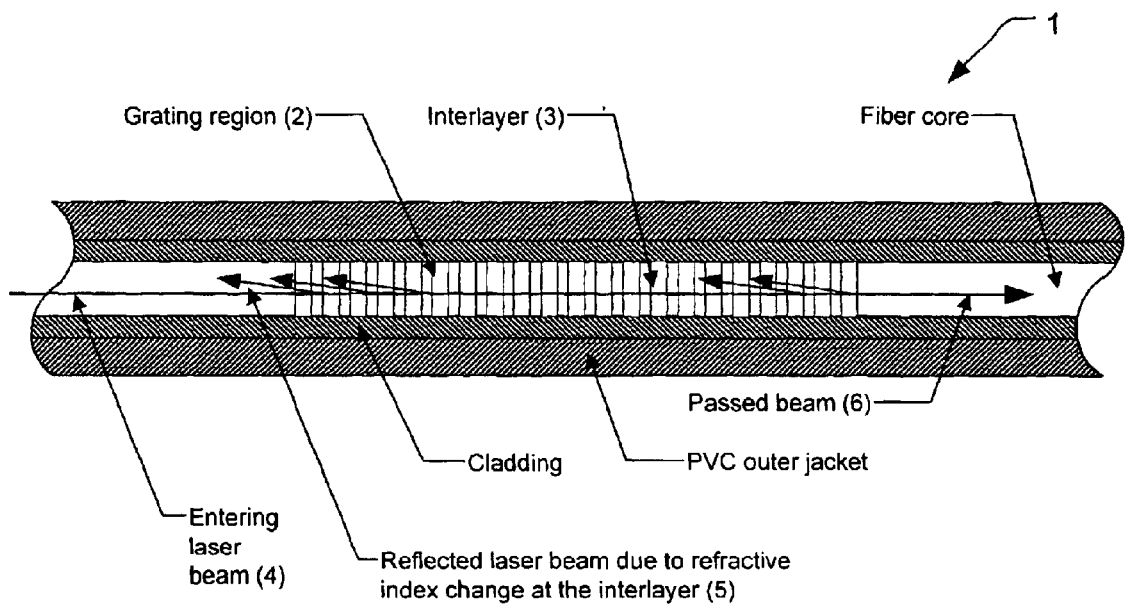
FIG. 2 (background art) is a cross sectional view of a conventional fiber Bragg grating, including a stylized depiction of a laser beam traveling through the grating.

A preferred embodiment of the present invention is a frequency detection, tuning and stabilization system (or more simply, a "frequency processing system"), particularly employing the capabilities of two-dimensional (2D) or three-dimensional (3D) optical gratings, which herein are termed "planar gratings" and "cubical gratings," respectively. As illustrated in the various drawings herein, and particularly in the view of FIG. 21, a first preferred embodiment of the invention is depicted by the general reference character 1000.

A basic narrow bandwidth Bragg type grating, that is a one-dimensional (1D) or a "linear grating," is used as the primary example for an initial discussion of manufacturing techniques that may be employed for 1D, 2D, and 3D grating variations. Linear gratings and the manufacturing techniques for such, generally, are the subject of the present inventors' co-pending patent application Ser. No. 09/953,468, hereby incorporated by reference in its entirety. Planar and cubical gratings and the manufacturing techniques for such, generally, are the subject of the present inventors' co-pending patent application Ser. No. 10/007,890, filed Nov. 9, 2001, hereby also incorporated by reference in its entirety.

Figure 3:
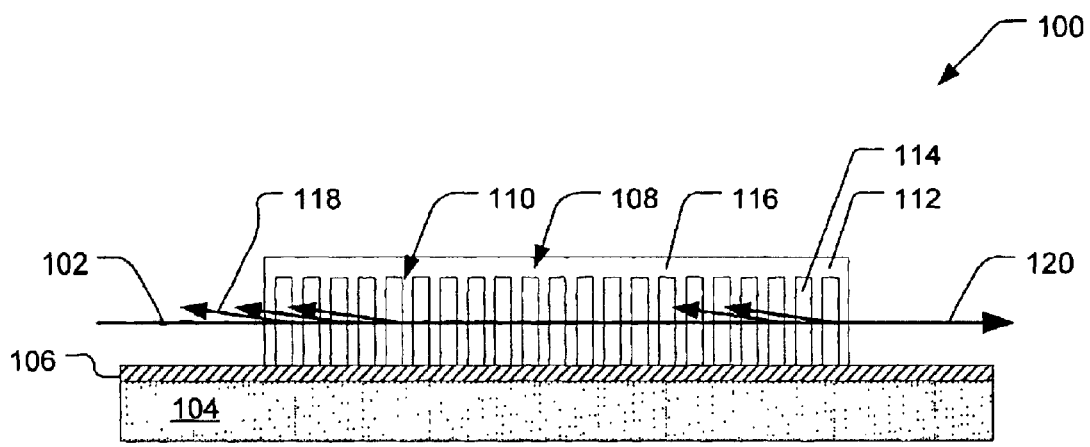
FIG. 3 is a cross sectional view of a one-dimensional (1D) or linear Bragg grating, including a stylized depiction of a laser beam traveling through the grating.

FIG. 3 is a cross sectional view depicting a one-dimensional (1D) or linear Bragg grating 100, with a laser beam 102 stylistically represented as traveling through it. The Bragg grating 100 includes a substrate 104, atop which the major operational elements have been constructed. The substrate 104 may be a material such as silicon wafer, glass plate, etc. A reflective layer 106 has been deposited atop the substrate 104. Suitable materials for this include inherently reflective ones, such as metallic coatings like gold, silver, or aluminum, as well as materials having a low refractive index relative to the refractive indices of the materials in a grating region (described next).

A grating region 108 is provided atop the reflective layer 106. Various materials and manufacturing techniques may be used to construct this grating region 108 and, in fact, a substantial part of the following discussion covers such variations. For purposes of this introduction, the grating region 108 can be viewed simply as including an interlayer 110 of regions of a first transmissive material 112 and a second transmissive material 114. The first transmissive material 112 and second transmissive material 114 have different refractive indices and are interspaced by one-quarter of the wavelength of light which the Bragg grating 100 will filter (or by an odd numbered multiple of one-quarter wavelength).

An over-fill layer 116 is provided atop the grating region 108. It may be a material having a different refractive index, relative to the refractive indices of the other materials in the grating region 108, it may be additional of the transmissive materials 112, 114 (as is shown here), or it may be a metallic coating similar to the reflective layer 106 used for similar purposes below the grating region 108.

Operationally, the Bragg grating 100 receives the laser beam 102 in the manner shown in FIG. 3. [For simplified explanation, "laser beam" is used herein as a generic term to represent all suitable light beams. Although light from laser sources is today predominantly used in applications where the Bragg grating 100 will be widely employed, those skilled in the art will readily appreciate that light from other sources may be used as well.] The reflective layer 106 serves to reflect strayed portions of the laser beam 102 back in the original direction. Similarly, the over-fill layer 116 also does this. Here the over-fill layer 116 is of the same material as the second transmissive material 114 and it reflects the laser beam 102 because its index of refraction is substantially higher than that of the surrounding air.

As the laser beam 102 passes through the interlayer 110 of the grating region 108 it encounters the boundaries between the first and second transmissive materials 112, 114. In particular, it encounters the respectively different refractive indices there. Partial reflection then occurs as the laser beam 102 passes through each boundary, forming a reflected beam 118 and a passed beam 120. [The reflected beam 118 is stylistically shown in FIG. 3 as a plurality of parts with incidence angles purposely skewed to distinguish the reflected beam 118 from the laser beam 102.] The reflected beam 118 will include a narrow range of wavelengths, formed in the characteristic manner of the Bragg condition by constructive interference in the light that is reflected, and the passed beam 120 includes the light of other wavelengths that were also present in the laser beam 102.

Figure 4A:
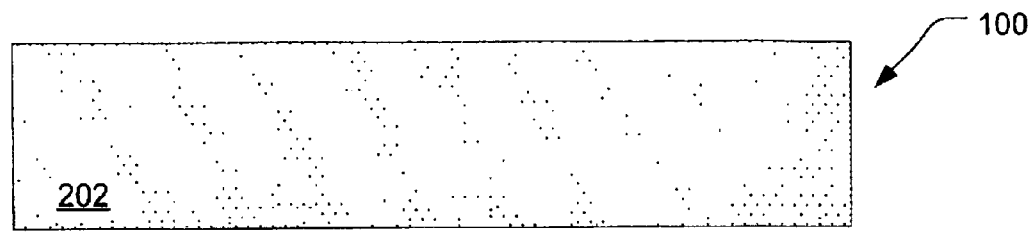
Figure 4B:
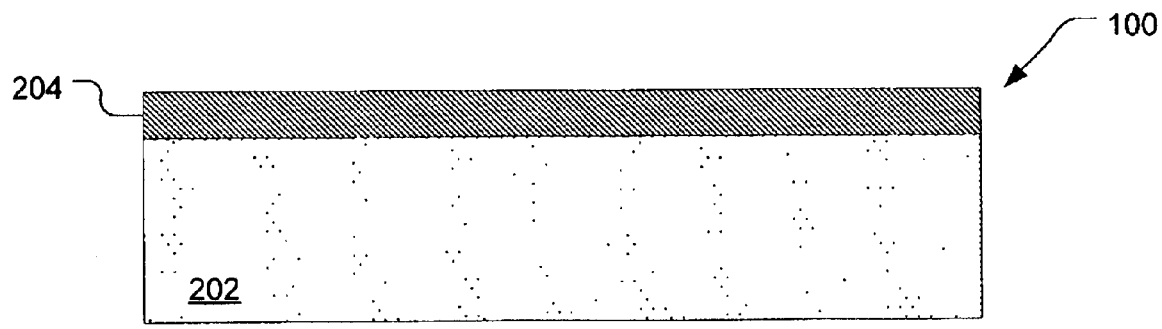
FIG. 4b is a cross section side view of the Bragg grating as a layer of photoresist is deposited.
Figure 4C:
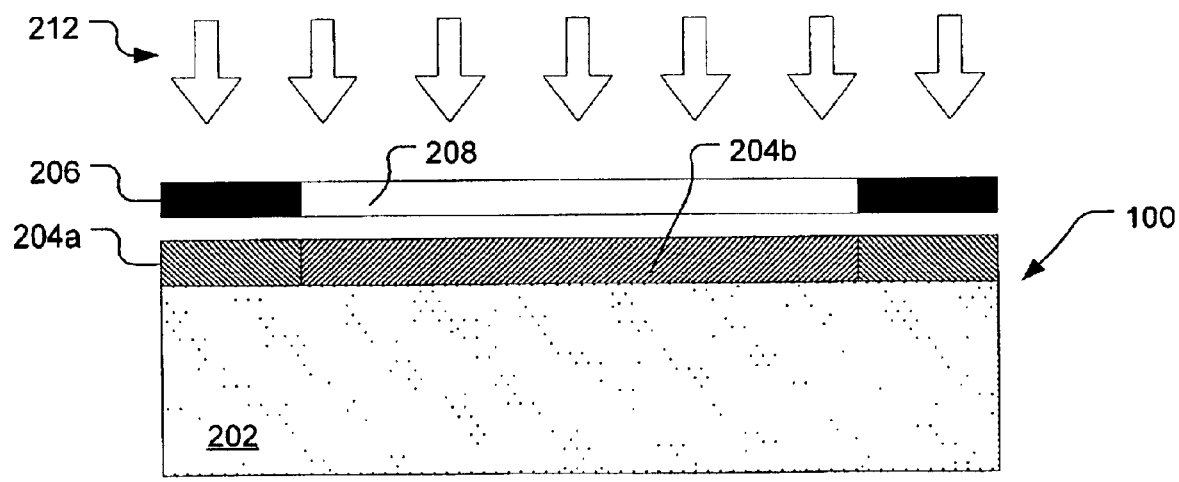
FIG. 4c is a cross section side view of the Bragg grating as it is exposed under a pattern.
Figure 4D:
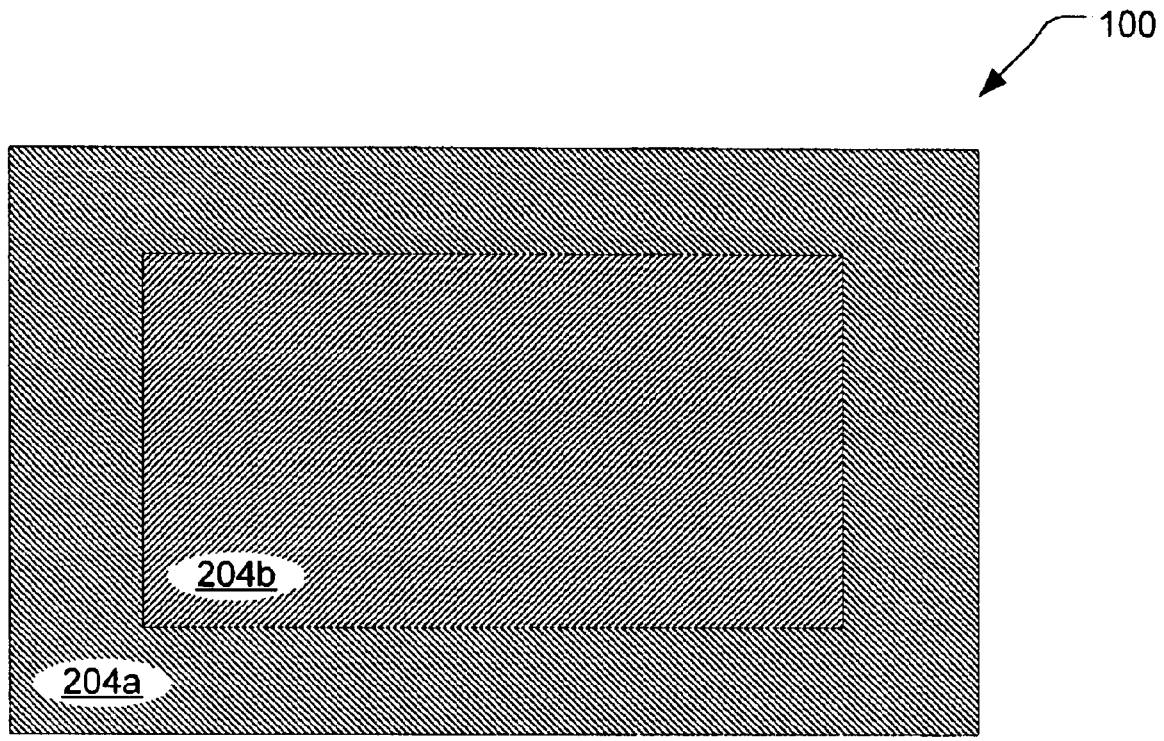
FIG. 4d is a top plan view of the Bragg grating after it is exposed.
Figure 4E:
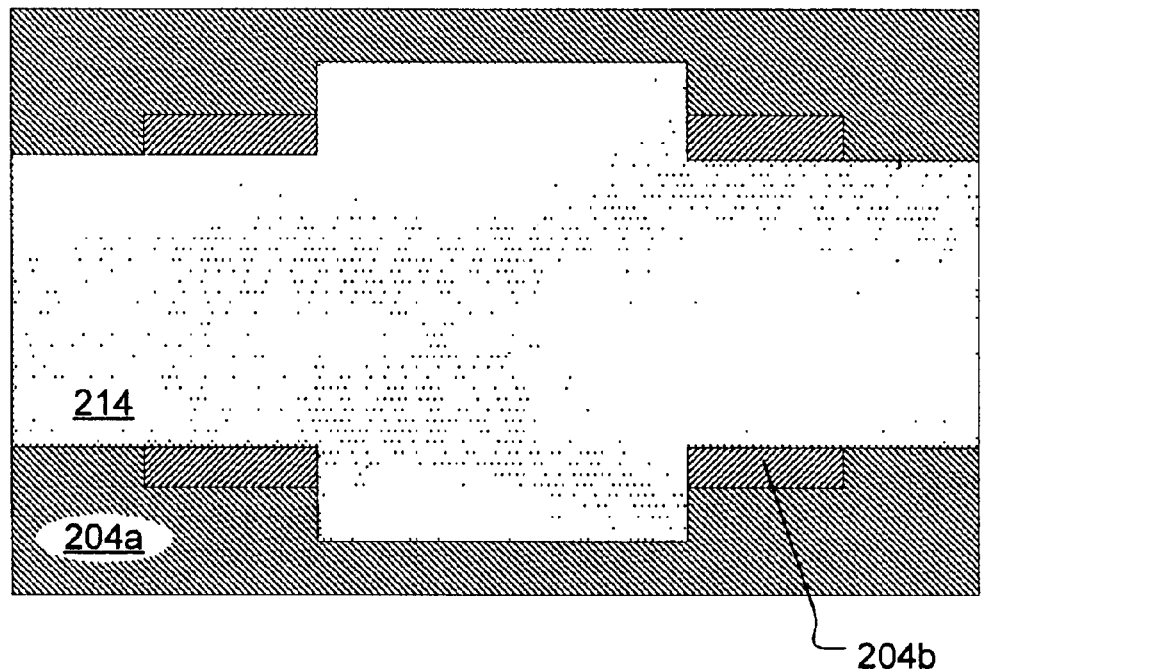
FIG. 4e is a top plan view of the Bragg grating after a transmissive layer is deposited.
Figure 4F:
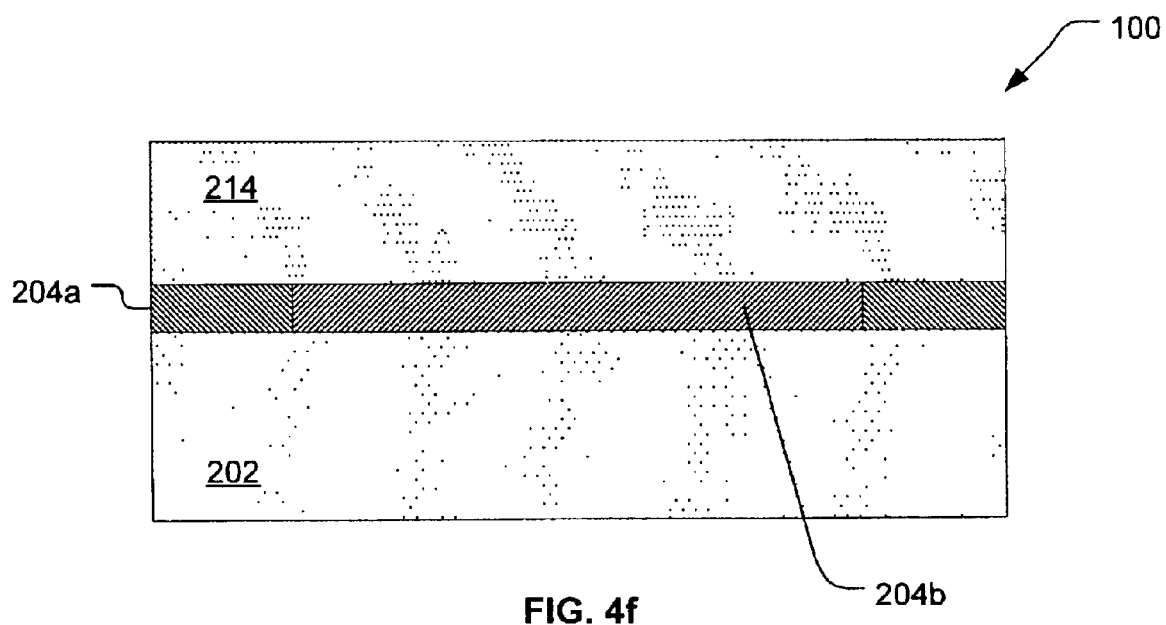
FIG. 4f is a cross section side view of the Bragg grating at the stage in FIG. 4e.
Figure 4G:
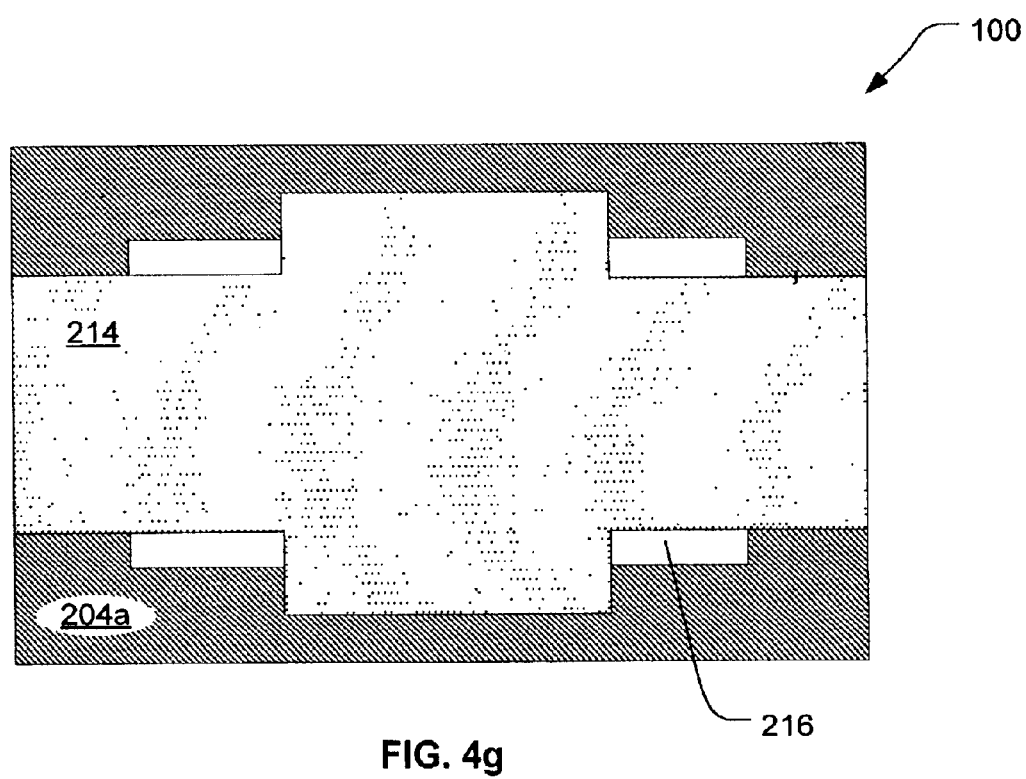
FIG. 4g is a top plan view of the Bragg grating after the exposed photoresist is removed.
Figure 4H:
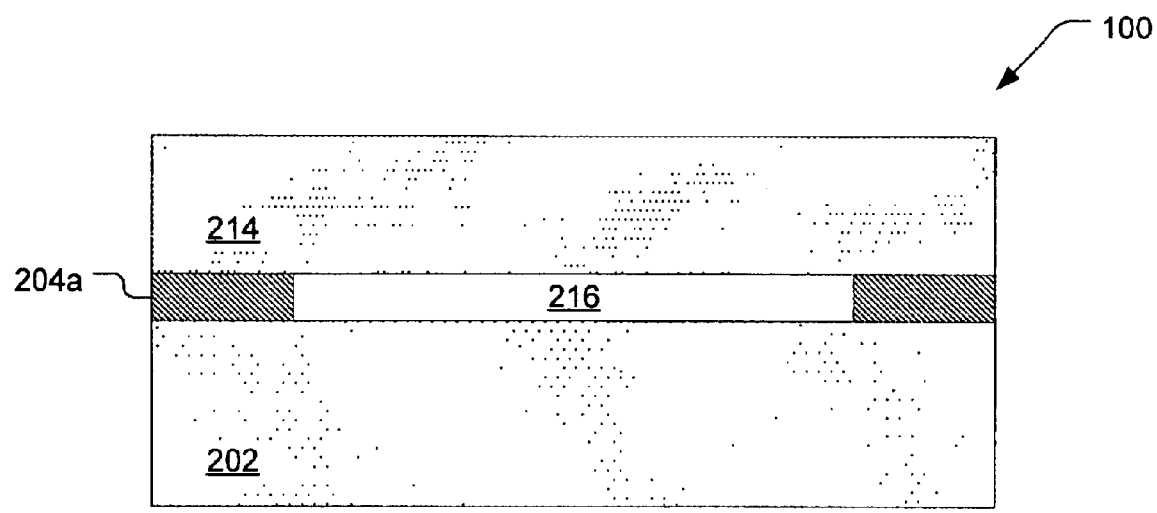
FIG. 4h is a cross section side view of the Bragg grating at the stage in FIG. 4g.
Figure 4I:
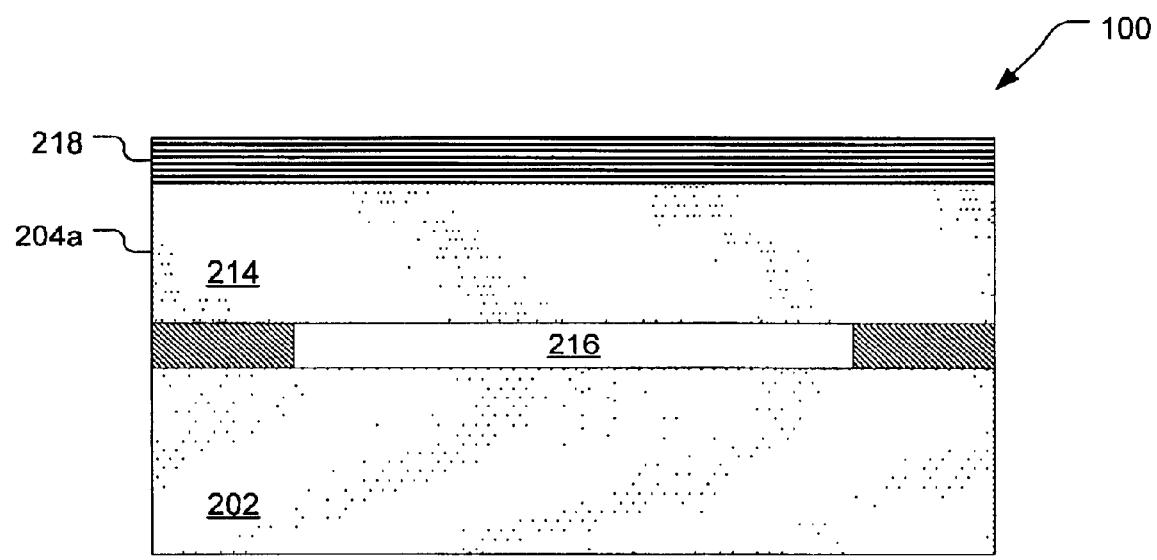
FIG. 4i is a cross section side view of the Bragg grating after a new layer of photoresist is deposited.
Figure 4J:
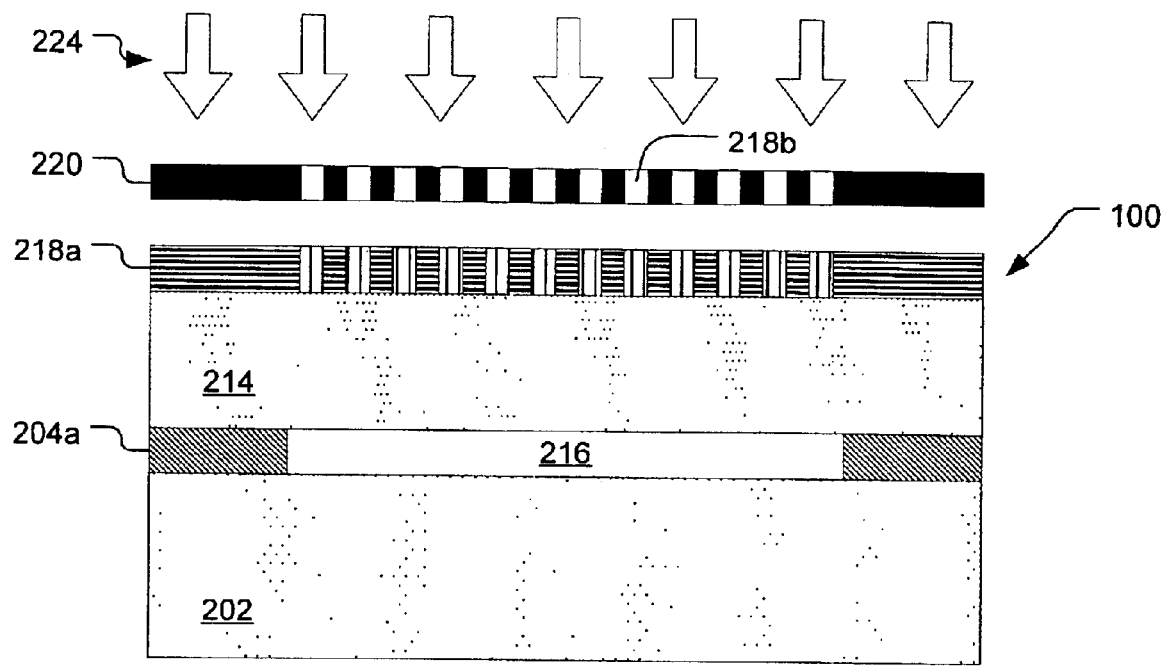
FIG. 4j is a cross section side view of the Bragg grating as it is exposed under a pattern.
Figure 4K:
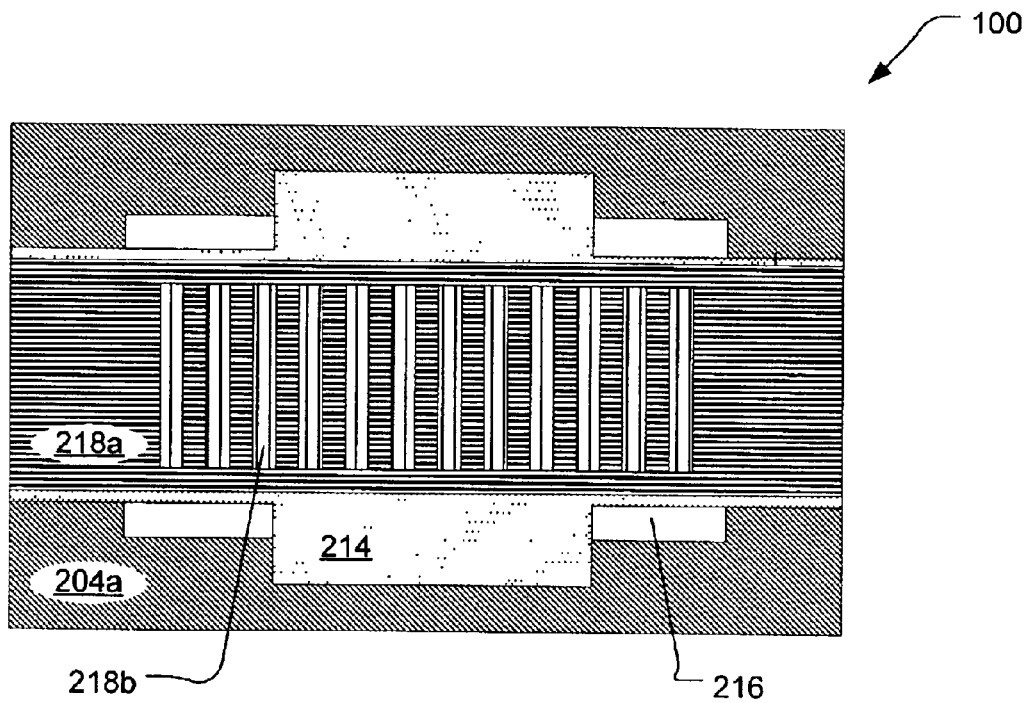
FIG. 4k is a top plan view of the Bragg grating after it is exposed.
Figure 4L:
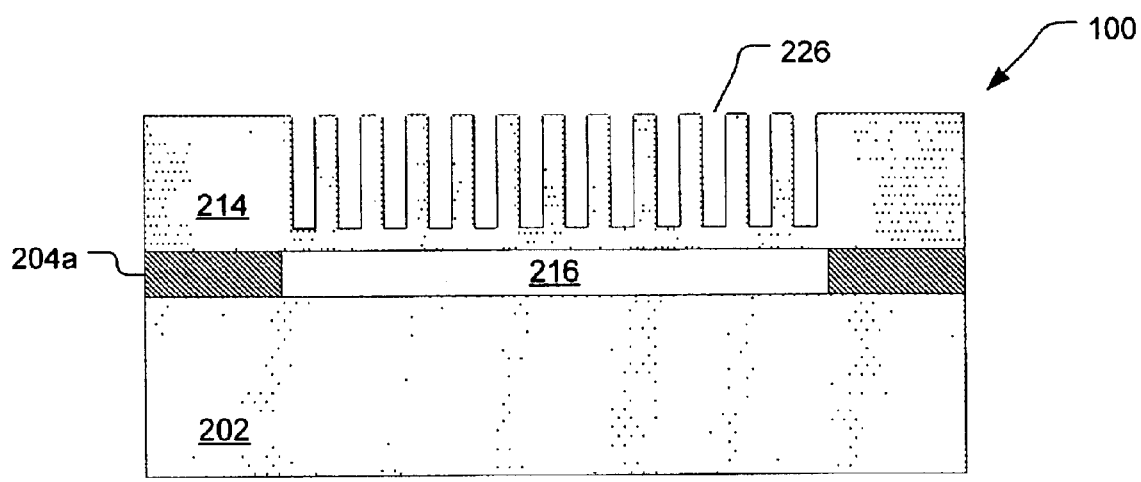
FIG. 4l is a cross section side view of the Bragg grating after the exposed photoresist and portions of the layer below are removed.
Figure 4M:
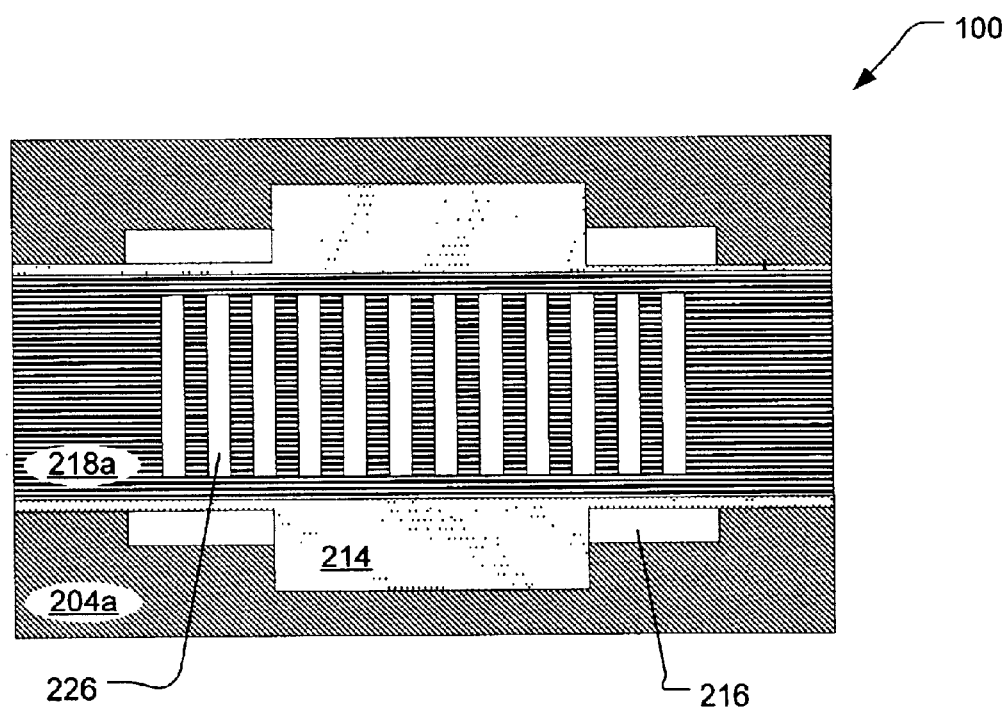
FIG. 4m is a top plan view of the Bragg grating at the stage in FIG. 4l.
Figure 4N:
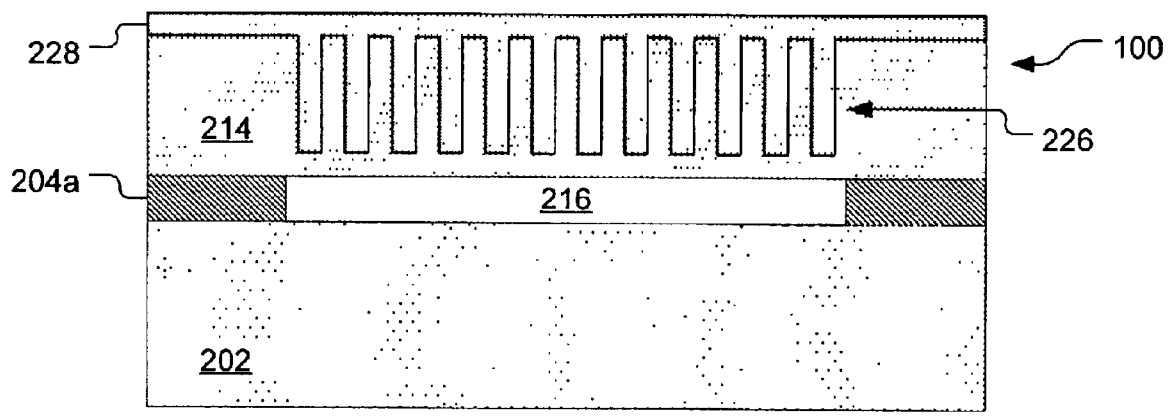
FIG. 4n is a cross section side view of the Bragg grating after a material having a different refractive index than the transmissive layer is deposited.
Figure 4O:
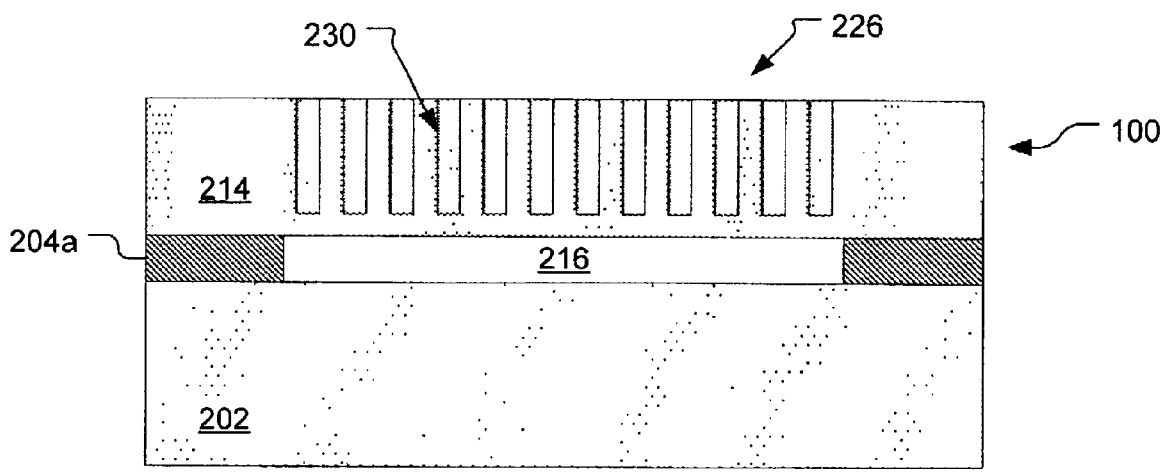
FIG. 4o is a cross section side view of the Bragg grating after excess material is removed.
Figure 4P:
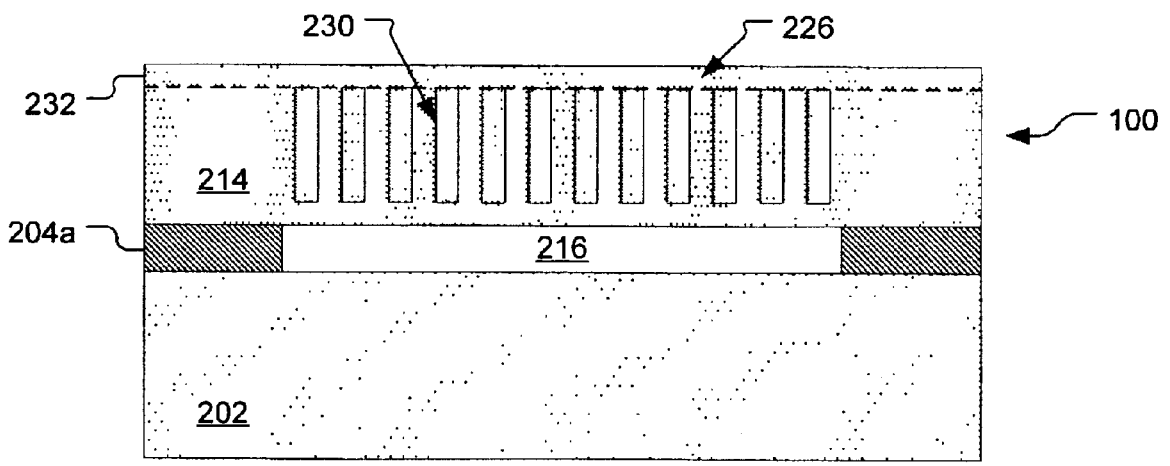

FIGS. 4a–p are a series of views at different stages of manufacture of one of a presently preferred embodiments of the Bragg grating 100. FIG. 4a is a side view of a substrate 202. As already noted, the substrate is of a suitable material upon which the major operational elements are constructed. At this initial stage the substrate 202 is essentially homogeneous. FIG. 4b is a side view after a photoresist layer 204 has been deposited atop the substrate 202.

FIG. 4c is a side view as the Bragg grating 100 is exposed. A photomask 206 having a pre-designated pattern 208 is provided and the Bragg grating 100 is exposed through it to light 212 which is appropriate for causing a photochemical reaction in the photoresist layer 204. This produces an unexposed region 204a and an exposed region 204b. FIG. 4d is a top view of the Bragg grating 100 after exposure, particularly depicting the unexposed region 204a and the exposed region 204b. Typically these would be termed to now have negative resist and positive resist, respectively.

FIG. 4e is a top view of the Bragg grating 100 after a transmissive layer 214 is deposited. As can be seen, some of the unexposed region 204a and some of the exposed region 204b of the photoresist layer 204 are left uncovered at this stage. FIG. 4f is a side view at this stage. The transmissive layer 214 has a thickness exceeding the height of light beams with which the Bragg grating 100 will later be used. In the inventor's presently preferred embodiment SiO2 is used for the transmissive layer 214. This material is easily "worked" as needed and its refractive index, of nominally 1.52, is also good. Many other materials may also be used, however. Without limitation, other suitable candidates which are widely used industrially are Al2O3, with a refractive index of 1.63, and MgF2, with a refractive index of 1.38. [Still other candidates include amorphous silicon-hydrate (SiH, SiH2, SiH3, SiH4), B, P, ZnSe, ZnS, GaP, SrTiO3, Si, Ge, InSb, YSZ, AlAs, BaTiO3, BiSiO20, Bi12GeO20, AlN, BN, AgGaS2, LiTaO3, CuCaS2, TlI, TlCl, TlBr, AgCl, AgBr, AgI, AgGaSe2, KnbO3, and even some organic materials.]

The unexposed region 204a remains once the exposed region 204b is removed (via any of various conventional means, chemical etching, dry etch techniques, subliming by baking, etc.). FIG. 4g is a top plan view and FIG. 4h is a side view of the Bragg grating 100 after removal. As can particularly be seen in FIG. 4h, removing the exposed region 204b leaves an air gap 216 between the substrate 202 and the transmissive layer 214. [Note, the "air gap" here may ultimately contain any gas present in the environment surrounding the Bragg grating 100. The inert gasses, N2, CO2, air, other gas mixtures, etc. are examples of gases commonly used in electronic equipment today. For that matter, the "air gap" can even be a vacuum. As will be seen in the operational discussion, below, the index of refraction of the air gap is what is key, and not what fills it.]

FIG. 4i is a side view of the Bragg grating 100 after a new photoresist layer 218 has been deposited, and FIG. 4j is a side view as it is exposed. A photomask 220 having a grating pattern 222 is here provided and the Bragg grating 100 is exposed through it to light 224. This produces an unexposed region 218a and a plurality of exposed regions 218b. FIG. 4k is a top view of the Bragg grating 100 after it is exposed in this manner, particularly showing the unexposed region 218a and the exposed regions 218b.

FIG. 4l is a side view of the Bragg grating 100 after the exposed regions 218b of the photoresist layer 218 and portions of the transmissive layer 214 below it have been removed. In FIG. 4l the unexposed region 218a is also shown as having already been removed. A key point to note, for this manufacturing variation, is that portions of the transmissive layer 214 are not removed so deeply that the air gap 216 is reached. The reason for this is provided in an operational discussion, below. FIG. 4m is a top view of the Bragg grating 100 at this stage. From FIG. 4l and FIG. 4m it can be appreciated that an array of open trenches now defines the grating region 226 in the transmissive layer 214.

FIG. 4n is a side view of the Bragg grating 100 after an over-fill layer 228 is deposited into the array of trenches. The over-fill layer 228 is of a material having a slightly different refractive index than the transmissive layer 214, and it fills in the openings grating region 226 so that a linearly extending interlayer array 230 is formed. The material of the over-fill layer 228 may be one of the same set of candidate materials for the transmissive layer 214, e.g., Si, SiO2, Al2O3, MgF2, etc., but it will either be of a different such material or, if the same, it will be treated to achieve a different refractive index.

FIG. 4o is a side view of the Bragg grating after excess material from the over-fill layer 228 has been removed. One process suitable for this is polishing. The unexposed region 218a was shown as having been already removed in FIG. 4l, but it could alternately have been left, the over-fill layer 228 applied atop it, and then it and the excess from the over-fill layer 228 removed together. In some manufacturing scenarios this is a matter of mere choice, but in others there may be an incentive to remove the over-fill layer 228 earlier. For instance, in common semiconductor fabrication processes organic photoresist materials are used. These are generally suitable for use here as well, but with early removal desirable to avoid contaminating the overfill layer 228 as it is later applied.

Finally, FIG. 4p is a side view of the Bragg grating 100 after a new transmissive layer 232 is deposited. In this embodiment the inventors prefer that the transmissive layer 214 and the transmissive layer 232 have the same refractive index, and thus that they be of the same material. This is not a requirement, however. The transmissive layer 232 may, for instance, be of the same material and have the same refractive index as the over-fill layer 228. As will become more clear in the discussion below, it is desirable that the over-fill layer 228 have a refractive index substantially different than that of air (refractive index=1). Thus a material like, say, MgF2 with a refractive index of 1.38, may be quite suitable for use in the over-fill layer 228 but not in the transmissive layer 232. This completes construction of the Bragg grating 100.

Figure 5A:
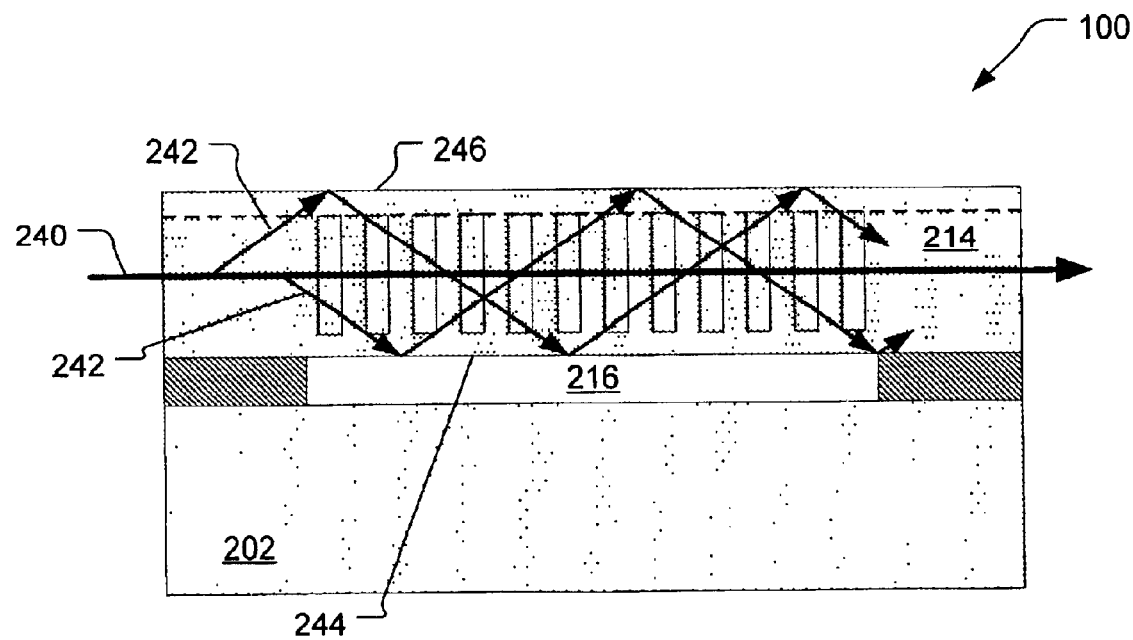
Figure 5B:
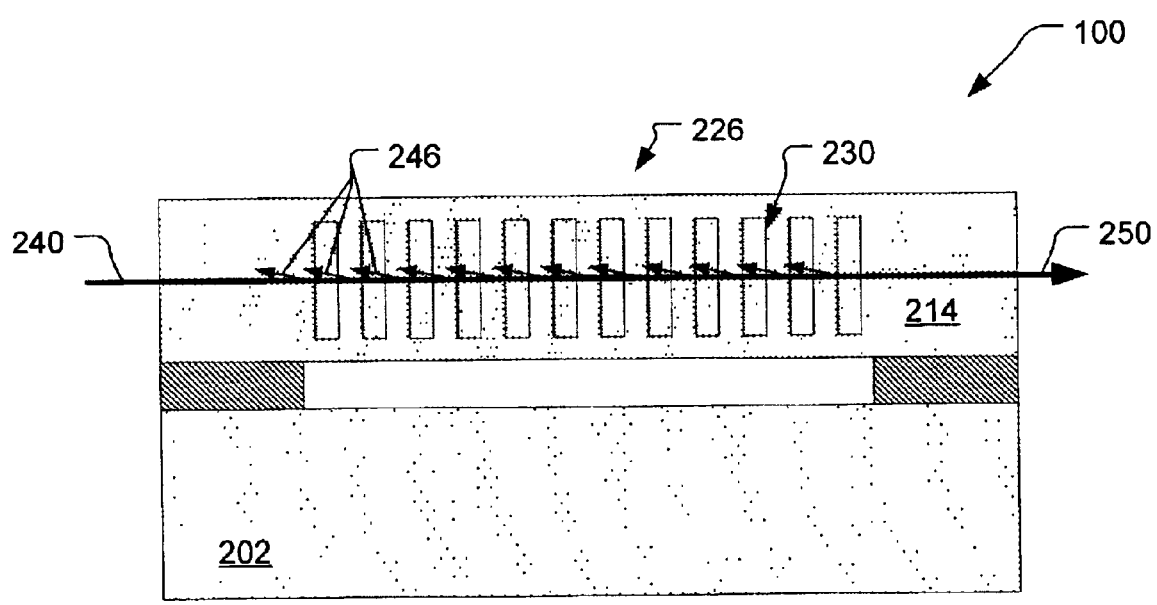

FIGS. 5a–b are cross section side views depicting a light beam 240 traveling through the finished Bragg grating 100 of FIGS. 4a–p. In FIG. 5a the light beam 240 has strayed portions 242, some of which go upward and others of which go downward. The downward traveling of the strayed portions 242 encounter an interface 244 at the juncture of the transmissive layer 214 and the air gap 216, and are reflected back into the transmissive layer 214. Similarly, the upward traveling of the strayed portions 242 encounter an interface 246 at the juncture of the transmissive layer 232 and the air above the Bragg grating 100, and are reflected back into the transmissive layer 232. Thus the interface 244 created at the air gap 216, and the disparity between the refractive indices, is used to achieve reflection. This is structurally different than the embodiment of FIG. 3, where the reflective layer 106 was deposited below the grating region 108, but it is functionally equivalent. The light beam 240 is thus here also able to travel through the Bragg grating 100 with minimum power loss.

FIG. 5b shows how the main portion of the light beam 240 encounters the interlayer array 230 in the grating region 226, how a reflected portion 248 (stylistically shown here also as a plurality of parts with purposely skewed incidence angles) is created, and how a passed portion 250 is passed. The reflected portion 248 will include a narrow range of wavelengths, formed by constructive interference, and the passed portion 250 will include the light of other wavelengths that are also present in the light beam 240.

Figure 6A:
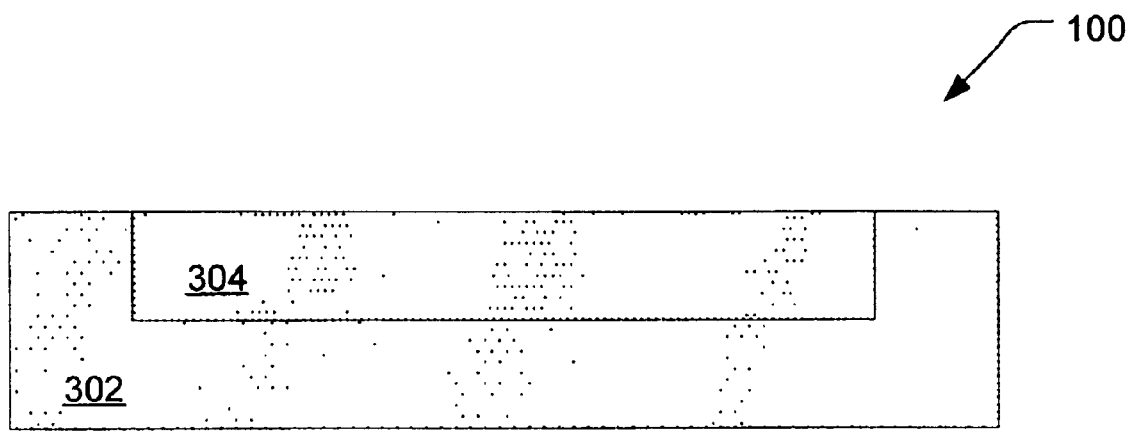
Figure 6B:
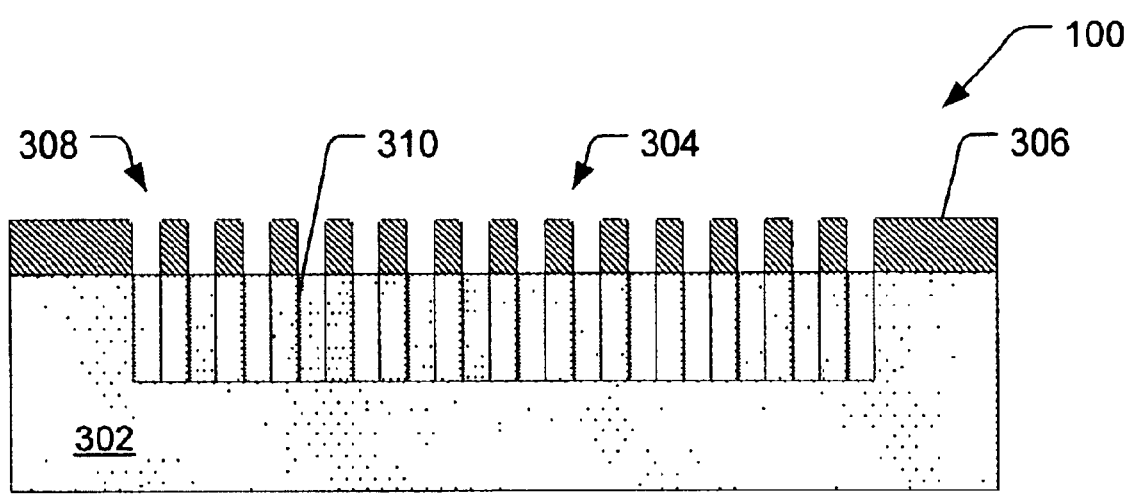

FIGS. 6a–b are side views at different stages of manufacture of a second embodiment of a Bragg grating 100. FIG. 6a shows the Bragg grating 100 in an early stage of manufacture, after a substrate 302 has had impurities diffused into a grating region 304. FIG. 6b shows the Bragg grating 100 in a later stage of manufacture, after a mask 306 having a suitable open grating pattern 308 has been applied and additional impurities have been diffused into the grating region 304 below the openings in the grating pattern 308 to form a linearly extending interlayer array 310. The Bragg grating 100 here can then be finished, in straightforward manner, by removing the mask 306 and applying an over-fill layer (not shown).

This approach employs the fact that the refractive indices for certain materials will change when impurities are diffused into them. One well known example is silicon: the refractive index for pure silicon is 3.5 but reduces to as low as 2.1 when a heavy dosage of hydrogen is diffused into it. The refractive index can further be reduced to even lower than 1.5 by incorporating different levels of oxygen. Another example material is silica (SiO2): when it's diffused with germanium and under exposure of UV light its refractive index increases slightly. The Bragg grating 100 depicted in FIGS. 6a–b can thus take advantage of these properties to obtain the desired characteristics in the interlayer array 310.

FIG. 7 is a flow chart summarizing a process 400 for creating the Bragg grating 100. The process 400 starts in a step 402, where basic and conventional set up operations can be performed, as needed and as desired.

In a step 404 a substrate is provided and prepared. This serves as the basis of a workpiece for the rest of the process 400 and for construction of the Bragg grating 100.

In a step 406 a lower reflective means is constructed.

In a step 408 a grating region having an interlayer is constructed.

In a step 410 an upper reflective means is constructed.

Finally, in a step 412 the process 400 ends. This is where basic and conventional wrap up operations can be performed, as needed and as desired. The process 400, which in deed has been described very generally, is now finished.

Figure 8:
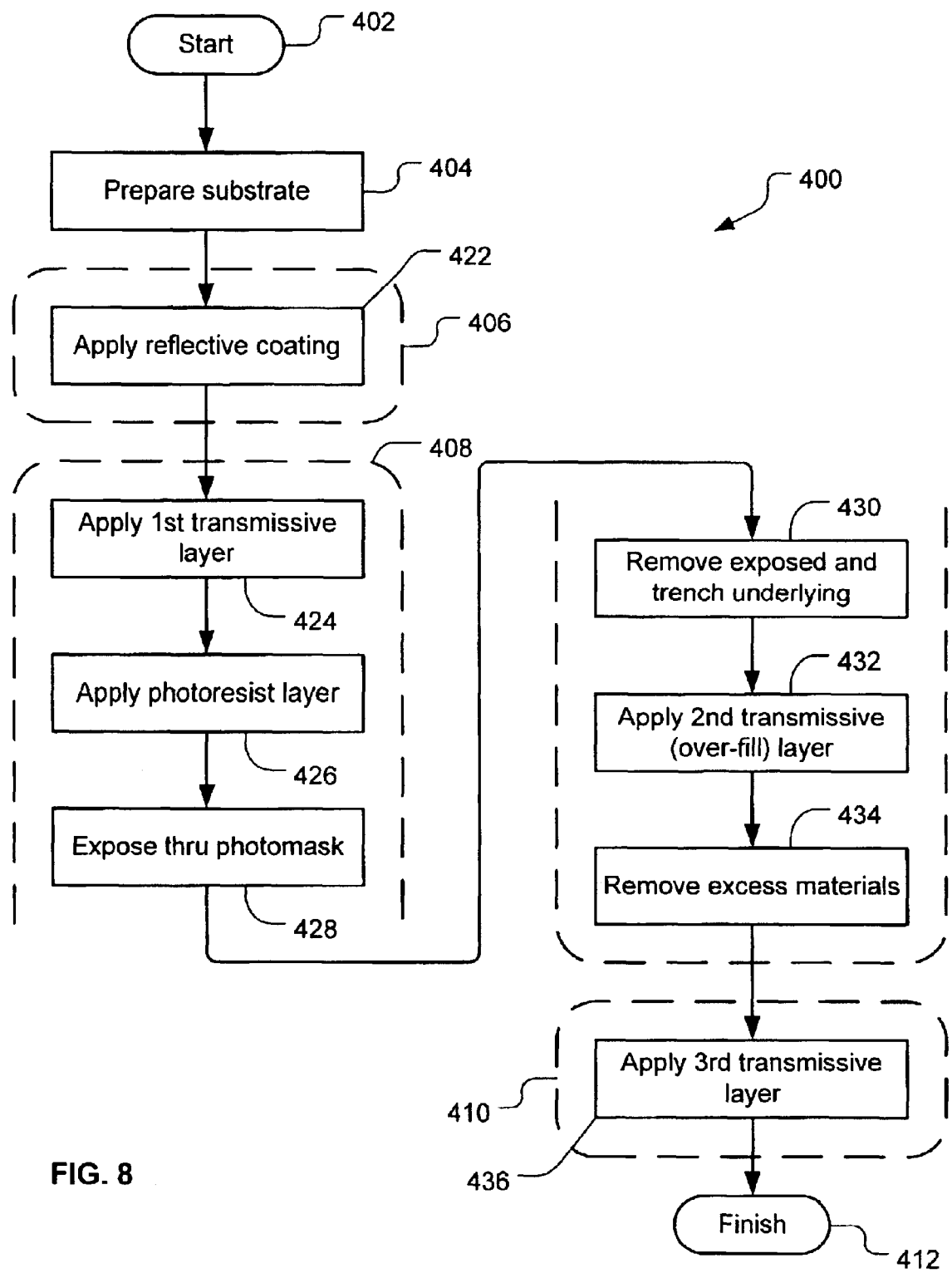
FIG. 8 is a flow chart showing application of the process to create the embodiment of the Bragg grating of FIG. 3.

FIG. 8 is a flow chart showing application of the process 400 to create the Bragg grating 100 of FIG. 3. The conventional or straightforward step 402 (start) and step 404 (substrate preparation) again occur. The step 406

(constructing a lower reflective means) here includes a single sub-step 422 for providing a reflective layer, such as a metallic coating, onto the (substrate) workpiece.

The step 408 (constructing the grating region and interlayer) here includes a number of sub-steps. The first of these is a sub-step 424 to provide a first transmissive layer on the workpiece, atop the reflective layer. In a sub-step 426 a first photoresist layer is then provided on the workpiece, atop the first transmissive layer. In a sub-step 428 the workpiece is exposed under a photomask. The photomask particularly has a pattern as already described, e.g., for a simple Bragg grating a pattern interspaced by one-quarter of the wavelength (or by an odd numbered multiple of that) of the light which will be filtered.

In a sub-step 430 the exposed portions of the first photoresist layer are removed. Underlying portions of the first transmissive layer are also removed to a desired depth.

In a sub-step 432 a second transmissive layer is applied to the workpiece, atop the unetched portions of the first photoresist layer and filling in the first transmissive layer. The second transmissive layer particularly has a different index of refraction than the first transmissive layer.

In a sub-step 434 excess material, that is the upper most material here, is removed from the workpiece. Specifically, the second transmissive layer and unetched portions of the first photoresist layer are removed to a depth at least flush with the top most portions of the first transmissive layer. This completes the step 408 (grating region and interlayer construction).

The step 410 (constructing the upper reflective means) here includes a single sub-step 436 for providing a third transmissive layer on the workpiece, atop the remaining first and second transmissive layer portions. This third transmissive layer has the same index of refraction as the first or second transmissive layer. In a final step 412 the process 400 is now finished.

Figure 9:
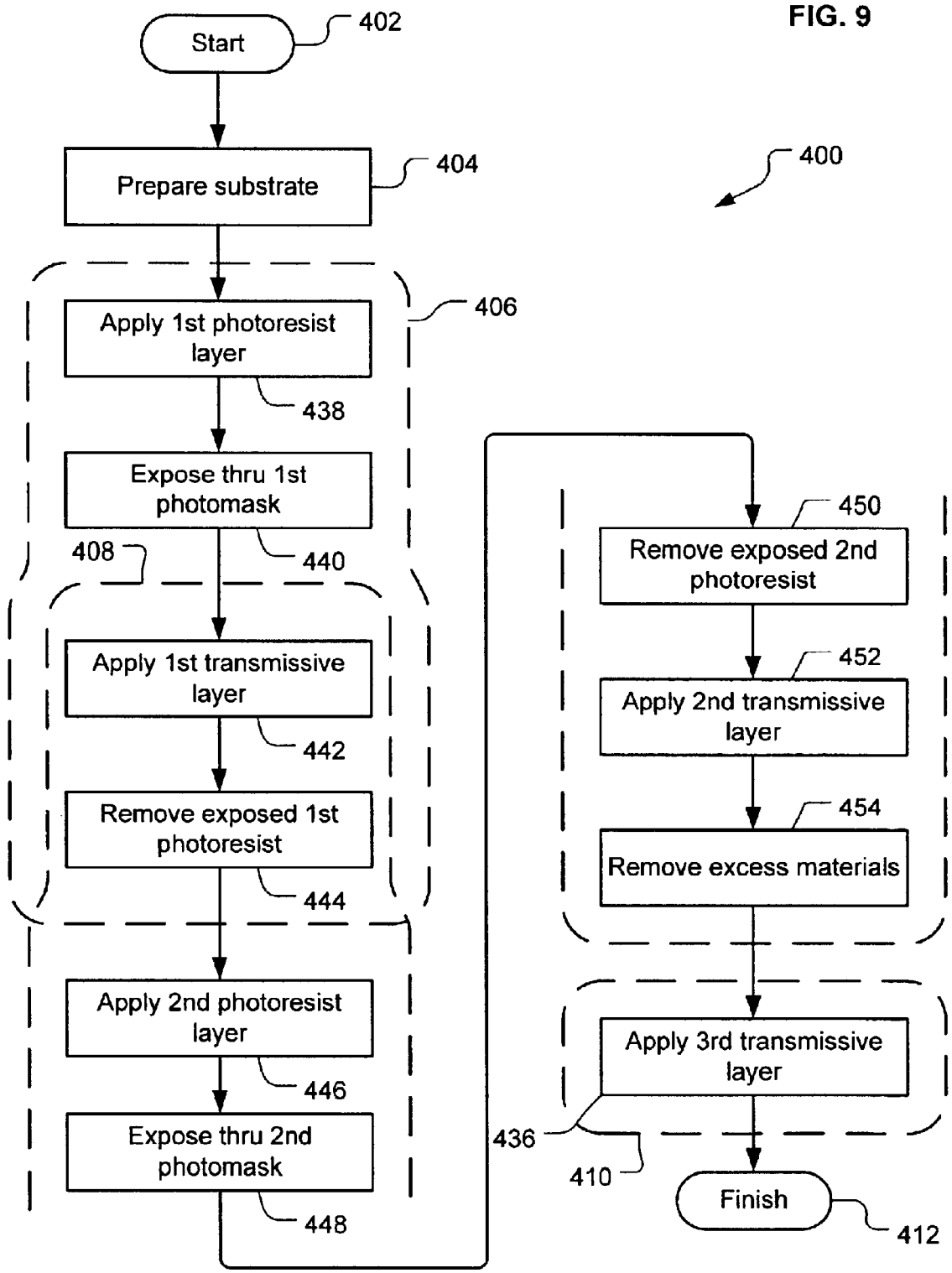
FIG. 9 is a flow chart showing application of the process to create the embodiment of the Bragg grating of FIGS. 5a–b.

FIG. 9 is a flow chart showing application of the process 400 to create the Bragg grating 100 of FIGS. 5a–b. The conventional or straightforward step 402 (start) and step 404 (substrate preparation) again occur.

The step 406 (constructing a lower reflective means) here includes a number of sub-steps. The first of these is a sub-step 438 to provide a first photoresist layer on the (substrate) workpiece. In a sub-step 440 the workpiece is exposed under a first photomask. In a sub-step 442 a first transmissive layer is provided on the workpiece, atop the first photoresist layer. In a sub-step 444 the exposed portion of the first photoresist layer is removed, leaving an air gap between the substrate and the first transmissive layer.

The step 408 (constructing the grating region and interlayer) here also includes a number of sub-steps. In fact, in this variation on the process 400 the sub-steps 442, 444 are part of both step 406 and step 408. The rest of the step 408 continues with a sub-step 446 where a second photoresist layer is applied to the workpiece, atop the first transmissive layer. In a sub-step 448 the workpiece is exposed under a second photomask having a suitable pattern.

In a sub-step 450 the exposed portions of the second photoresist layer and the underlying first transmissive layer are removed to a desired depth. This leaves an array of openings or trenches.

In a sub-step 452 a second transmissive layer is applied to the workpiece, atop the unetched portions of the second photoresist layer and filling in the trench array in the first transmissive layer. This second transmissive layer has a different index of refraction than the first transmissive layer.

In a sub-step 454 the upper most material, specifically the second transmissive layer and unetched portions of the second photoresist layer, is removed to a depth at least flush with the top most portions of the first transmissive layer. This completes the step 408 (grating region and interlayer construction).

The step 410 (constructing the upper reflective means) here includes the single sub-step 436 for providing a third transmissive layer on the workpiece, atop the remaining first and second transmissive layer portions. This can be essentially the same as the step 410 and sub-step 436 of FIG. 8. In a final step 412 the process 400 is now finished.

FIG. 10 is a flow chart showing application of the process 400 to create the Bragg grating 100 of FIGS. 6a–b. The conventional or straightforward step 402 (start) and step 404 (substrate preparation) again occur.

The step 406 (constructing a lower reflective means) here may be viewed as a variation of the approach used for step 410 in FIG. 8 and FIG. 9, or as a variation of the approach used for step 406 FIG. 9. A lower reflector is formed by the interface of the material of the substrate with air or another material below the substrate. As discussed, below, the grating region need not extend all the way down and through the substrate, and the excess material in the substrate thus can serve as part of the lower reflector. In this regard, step 404 and step 406 are essentially merged. Alternately, a reflective material can be applied, similar to the reflective coating used in sub-step 422 in FIG. 8.

The step 408 (constructing the grating region and interlayer) here includes a number of sub-steps. The first of these is a sub-step 456 to dope a portion of the substrate (or a first transmissive layer atop a substrate) which will ultimately become the grating region with an impurity. In a sub-step 458 a mask is constructed on the workpiece, atop the grating region. In a sub-step 460 an additional or other impurity is doped into the non-masked portions of the grating region. In a sub-step 462 the mask is removed.

The step 410 (constructing the upper reflective means) here may include the approach shown in FIG. 8 for step 406, using sub-step 422, or it may include the approach shown in FIG. 8 and FIG. 9 for step 408, using sub-step 436. Finally, in a step 412 the process 400 is finished. It is, however, a straightforward extension of the process 400 to use multiple iterations of the various steps, to construct the sophisticated variations on the Bragg grating 100 which are now described.

With reference back to the earlier figures, more than two transmissive materials can be placed into the path a light beam will encounter. In FIG. 5b two materials having two indices of refraction are present in the transmissive layer 214 and in the interlayer array 230. In FIG. 6b, the substrate 302 is one material having one index of refraction, and the interlayer array 310 is effectively of two other materials (after it is doped or has impurity diffused into it). Even variations on the Bragg grating 100 like those in FIG. 3, FIGS. 5a–b, and FIGS. 6a–b are relatively simple, and the true scope of the possible variations is much broader. It is a straightforward extension of the process 400 to use multiple materials (actual different materials or effectively so by treatment to change the indices of refraction). One reason to do this is to handle multiple frequencies in a light beam, or to broaden the bandwidth of the frequencies filtered. Similarly, the spacing of the regions in the interlayers 110, 230, 310 can be changed to do this, much in the manner of periodically "chirped" prior art Bragg gratings.

One sophisticated manufacturing technique which may be used is to tune the indices of refraction. For instance, amorphous silicon-hydrate (SiH, SiH2, SiH3, SiH4) can be "tuned" by temperature. This can be used to obtain specific desired indices of refraction, or to apply a gradient in the indices in one or more materials. In this manner, the index of refraction is another factor which can be controlled during grating fabrication to achieve chirped or other sophisticated grating types.

Figure 11:
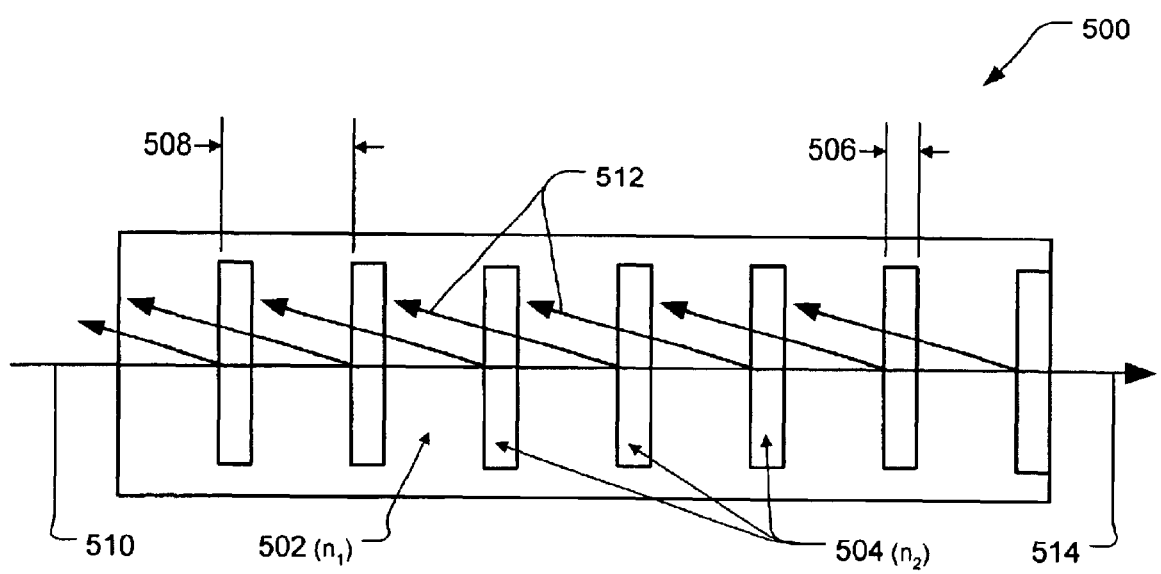
FIG. 11 is a schematic representation summarizing the structure and operation of a one-dimensional (1D) or linear grating, such as the Bragg gratings of FIGS. 3–6b.
Figure 12:
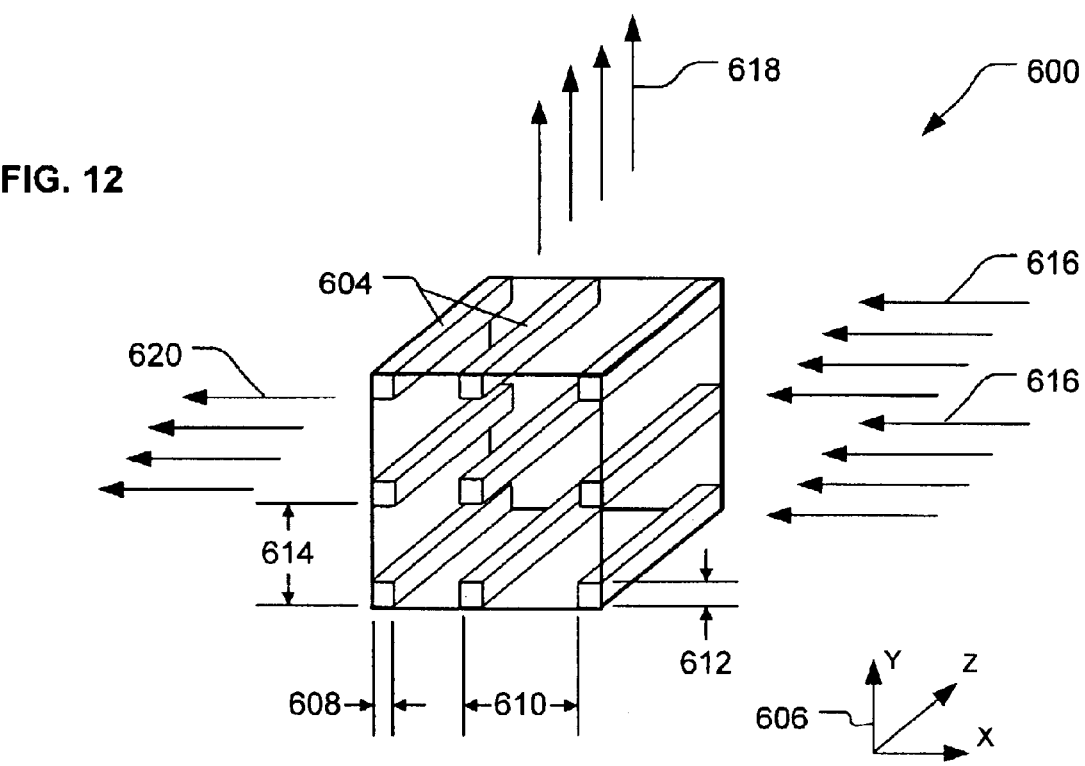
FIG. 12 is a perspective view showing that the principles of the linear grating of FIG. 11 can be extended to a 2D or planar grating.
Figure 13:
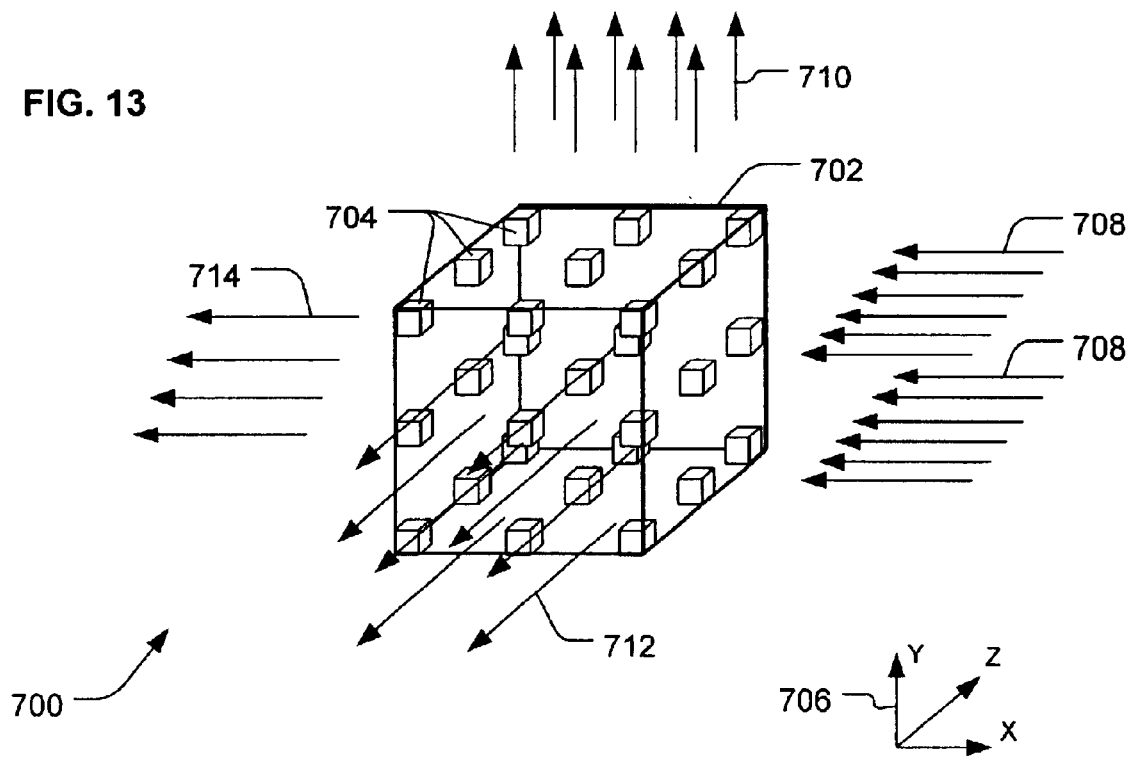
FIG. 13 is a perspective view showing that the principles of the linear grating and the planar grating can be further extended to a 3D or cubical grating.
Figure 20:
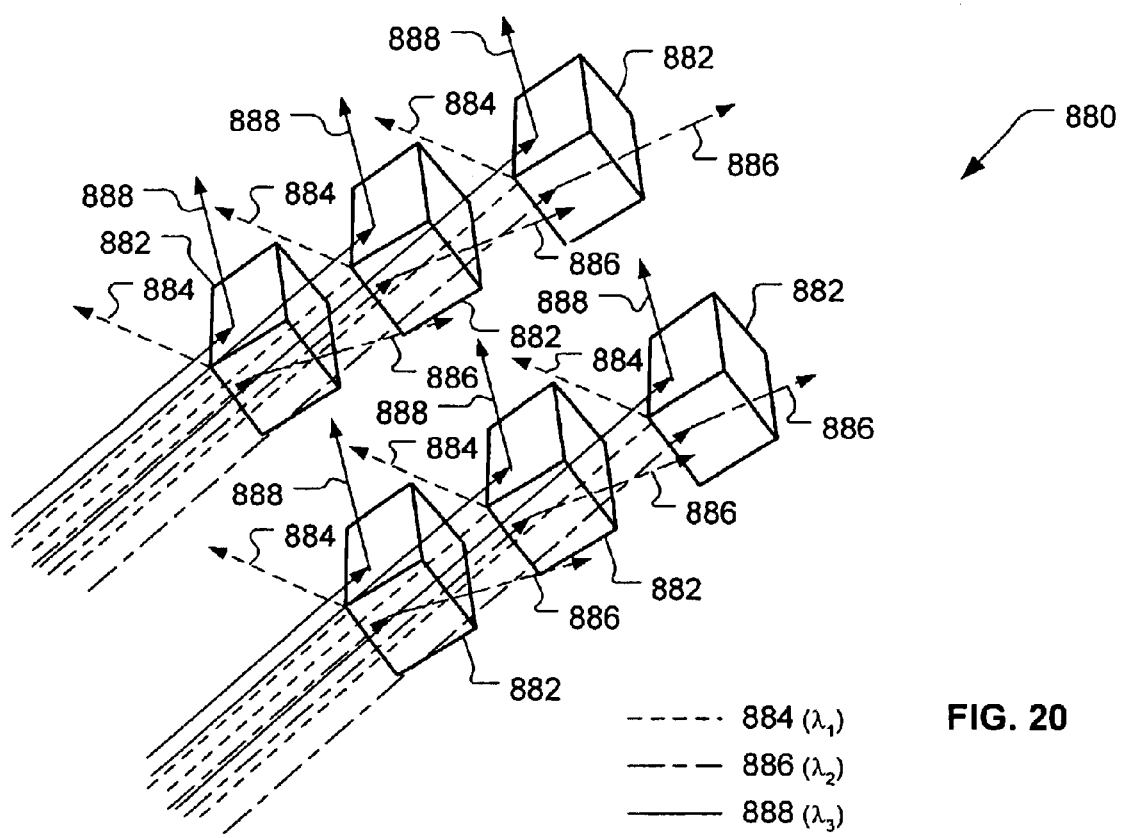
FIG. 20 is a perspective view of a three-dimensional (3D) generic grating.
Figure 18:
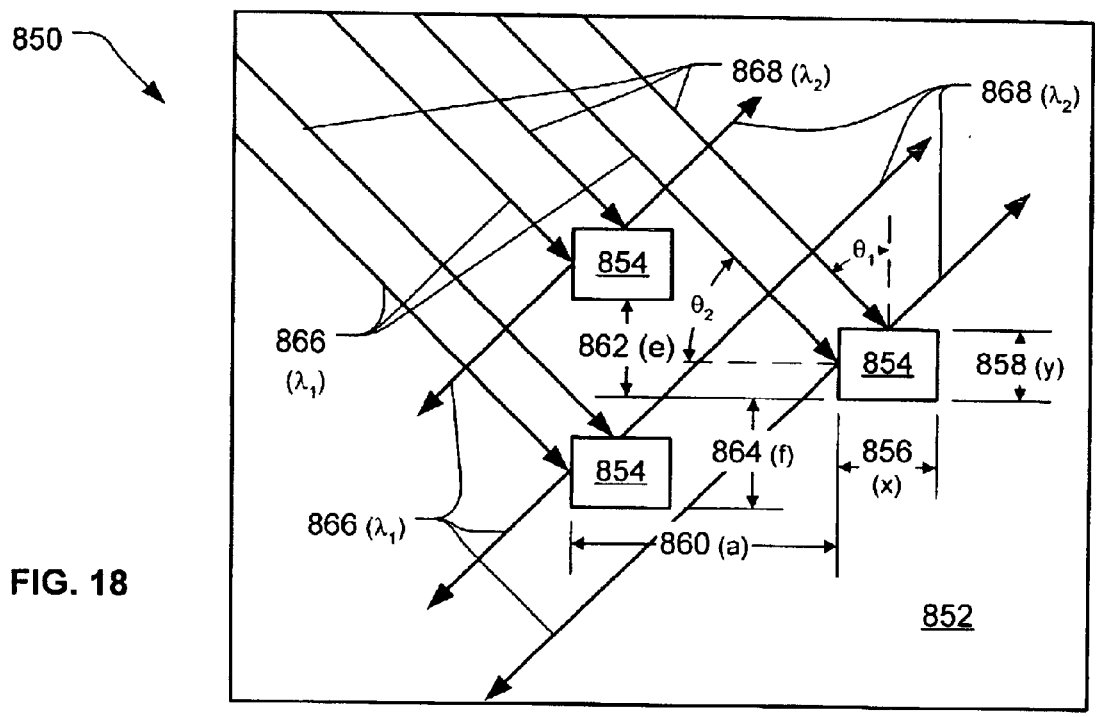
FIG. 18 is a schematic representation of the general case of FIG. 17 extended to operate in two dimensions, on two wavelengths, by using non symmetrical relationships in a generic grating.
Figure 19:
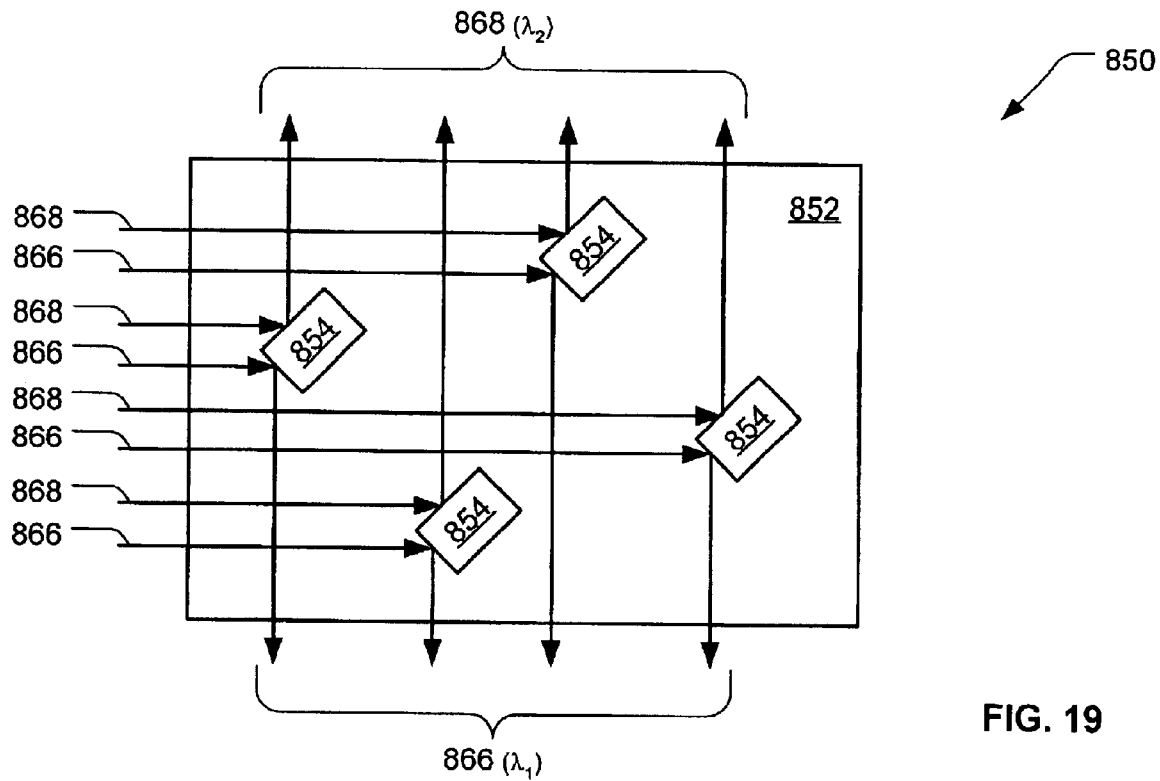
FIG. 19 is a schematic representation of the non symmetrical generic grating of FIG. 18 as it might typically be applied in an actual planar or cubical grating.

FIG. 11 is used next to summarize the one-dimensional (1D) or linear grating. FIGS. 12 and 13 then help in an introduction illustrating that the principles of the one-dimensional (1D) or linear grating can be extended to provide a two-dimensional (2D), planar grating, and also a three-dimensional (3D), cubical grating. FIGS. 14–17 support derivations extending the principles to the multidimensional, 2D and 3D cases. And FIGS. 18–20 depict how gratings having multiple dimensions may have different optical properties relative to each such dimension.

FIG. 11 depicts the structure and operation of a 1D or linear grating 500 (e.g., any of the variations of the Bragg grating 100 already discussed). The linear grating 500 is made of at least two different transparent materials. One of these serves as a background material 502 and one or more others are interlayer materials, with multiple regions of one interlayer material 504 represented here.

The diffraction efficiency in the linear grating 500 depends on the effective refractive index of the particular interlayer material 504 and the background material 502. The simplest case is depicted in FIG. 11, where just two materials are employed having refractive indices of $n_1$ and $n_2$. The background material 502 can have either $n_1$ or $n_2$, depending on manufacturing convenience, and here it has arbitrarily been made $n_1$.

The regions of the interlayer material 504 ($n_2$) are provided with a thickness 506 such that the phase difference between the reflecting portions of a light beam from both surfaces of a region are multiples of 360 degrees. This insures that constructive interference for a specific wavelength can occur. A similar rational, achieving constructive interference, applies to providing a separation 508 between the regions of the interlayer material 504.

In operation, a light beam 510 may be directed into the linear grating 500, as shown in FIG. 11, to form a reflected beam 512 (shown here skewed for emphasis) and a passed beam 514. The reflected beam 512 will contain the light of the specific wavelength for which constructive interference occurs, and the passed beam 514 will contain all other wavelengths. Thus, the linear grating 500 can be used as a filter to obtain light of high wavelength purity. Alternately, in the manner of prior art gratings, the thicknesses 506 and the separations 508 of the regions of the interlayer material 504 may be varied to "chirp" the linear grating 500 and thereby broaden the reflected beam 512 to include a range of wavelengths.

FIG. 12 is a stylized perspective view showing that the principles of the linear grating 500 of FIG. 11 can be extended to a 2D or planar grating 600. The planar grating 600 has a background 602 containing a grid of cells 604. The background 602 has a refractive index, say, $n_1$, and the cells 604 have at least one different refractive index. For simplicity in this discussion, the cells 604 are all of the same material and refractive index, say, $n_2$.

In FIG. 12 an XYZ-axes icon 606 shows a standard Cartesian reference scheme used to facilitate this discussion. The cells 604 have a respective thickness 608 and separation 610 along the X-axis, and also a respective thickness 612 and separation 614 along the Y-axis. These can be chosen in much the same manner as the thickness 506 and the separation 508 of the linear grating 500. Furthermore, if desired, the respective sets of these may be chosen to be different, to obtain constructive interference for different specific wavelengths (discussed in more detail, presently).

FIG. 12 also includes stylized representations of a light beam 616, a diffracted beam 618, and a passed beam 620, to depict how the planar grating 600 employs constructive interference in the XY-plane. The light beam 616 may contain a number of light wavelengths, including one which meets the Bragg condition for the thicknesses 608, 612, separations 610, 614, and refractive indices here. The diffracted beam 618 will then contain only light of the wavelength meeting the Bragg condition provided for, while the passed beam 620 will contain the other wavelengths present.

FIG. 13 is a stylized perspective view showing that the principles of the linear grating 500 and the planar grating 600 can be further extended to a 3D or cubical grating 700. The cubical grating 700 has a background 702 containing a grid of cells 704. The background 702 has a particular refractive index and the cells 704 have one or more other refractive indices. For simplicity, the cells 704 here are all of the same material.

In FIG. 13 an XYZ-axes icon 706 shows a standard Cartesian reference scheme used to facilitate this discussion. The cells 704 have respective thicknesses along the X-axis, Y-axis, and Z-axis, and also respective separations along each of these axes. If desired, these respective dimension sets may also be chosen to be different, to obtain constructive interference for different specific wavelengths. That is the case here and two of the three possible sets of thicknesses and separations have been chosen to be different.

FIG. 13 also includes stylized representations of a light beam 708, a first diffracted beam 710, a second diffracted beam 712, and a passed beam 714. The cubical grating 700 here employs one condition of constructive interference in the XY-plane as well as a second condition of constructive interference in the ZX-plane. The light beam 708 may contain a number of light wavelengths, including two which meet the respective Bragg conditions designed for here. The first diffracted beam 710 will thus contain the light wavelength subject to diffraction in the XY-plane, the second diffracted beam 712 will thus contain the light wavelength subject to diffraction in the YZ-plane, and the passed beam 714 will contain the other wavelengths. This is now explained in further detail in a coverage of the principles underlying the inventive planar grating 600 and the inventive cubical grating 700.

Figure 14:
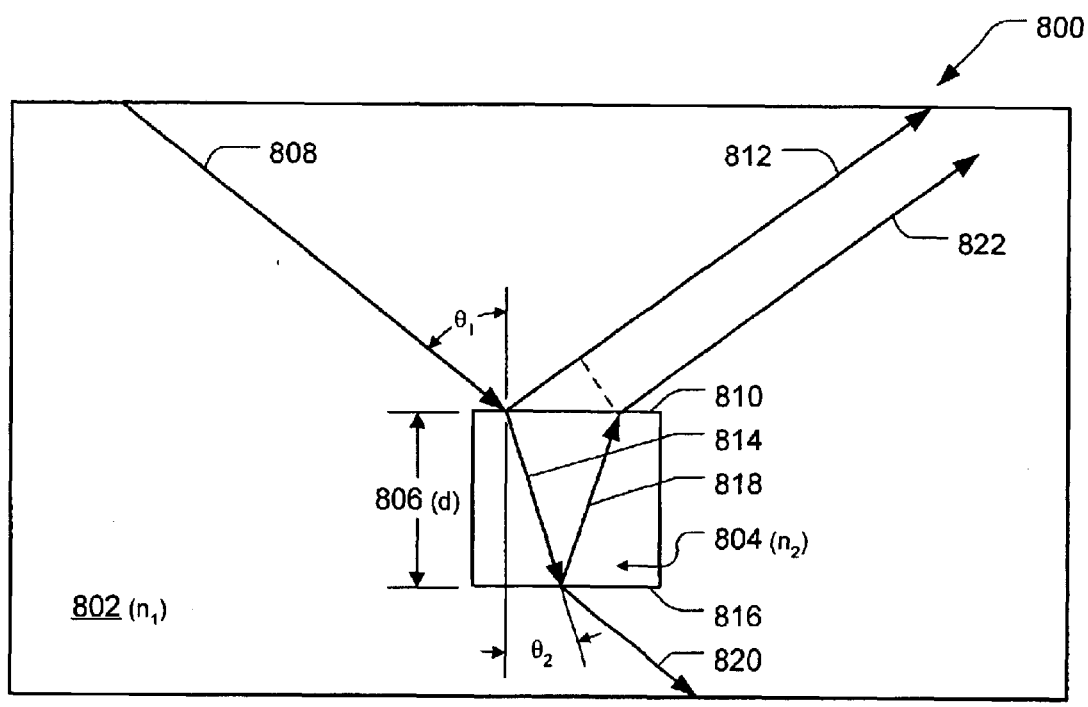
FIG. 14 is a schematic representation of surface-to-surface or intra-cell refraction effects in a grating.

Turning now to derivations of how the principles in one dimension extend to multiple dimensions, FIG. 14 illustrates cell interference (based on intra-cell refraction) in a generic grating 800. A background 802 is provided having a refractive index $n_1$, and is shown here with a single cell 804 (potentially one of many which may be present in embodiments of planar or cubical gratings). The cell 804 is of a material having a different refractive index, $n_2$, and it has a thickness 806 (d).

When a light beam 808 (carrying a wavelength λ) travels through the background 802 (medium $n_1$) and shines on a first surface 810 of the cell 804 at an incidence angle $\theta_1$, a first reflected portion 812 (of the light beam 808) is produced and reflected from the cell 804, as shown. Concurrently, as similarly occurs in the linear grating, the rest of the light beam 808 transmits into the cell 804 (medium $n_2$) as a first refracted portion 814. This first refracted portion 814 is refracted at the first surface 810 according to the law of refraction, or Snell's law:

$$n_1 * \sin \theta_1 = n_2 * \sin \theta_2,$$

where $\theta_2$ is the refracted angle in the cell 804. The first refracted portion 814 then travels through the cell 804 until it encounters a second surface 816 of the cell 804, where part of it is reflected as a second reflected portion 818 and the rest exits the cell 804 as a transmitted portion 820.

The second reflected portion 818 travels back to the first surface 810, where it is refracted back into the background 802 as a second refracted portion 822. This second refracted portion 822 constructively interferes with the first reflected portion 812 if the thickness 806 (d) and the refracted angle $\theta_2$ satisfy the condition (based on Bragg's law):

$$2*n_2*d*\cos \theta_2 = k*\lambda, \quad \text{Eq. 1:}$$

where k is an integer.

The transmitted portion 820 simply exits the cell 804 and continues to propagate in the original direction of the light beam 808, potentially to encounter and interact with another cell, and repeat the phenomenon.

It follows that by design with proper values for $n_1$, $n_2$, d, and the incidence angle $\theta_1$, that portions of the light beam 808 can be made to constructively interfere and, in a grating constructed accordingly, the cells will behave like scatterers, to scatter light beams in a designated direction.

Figure 15:
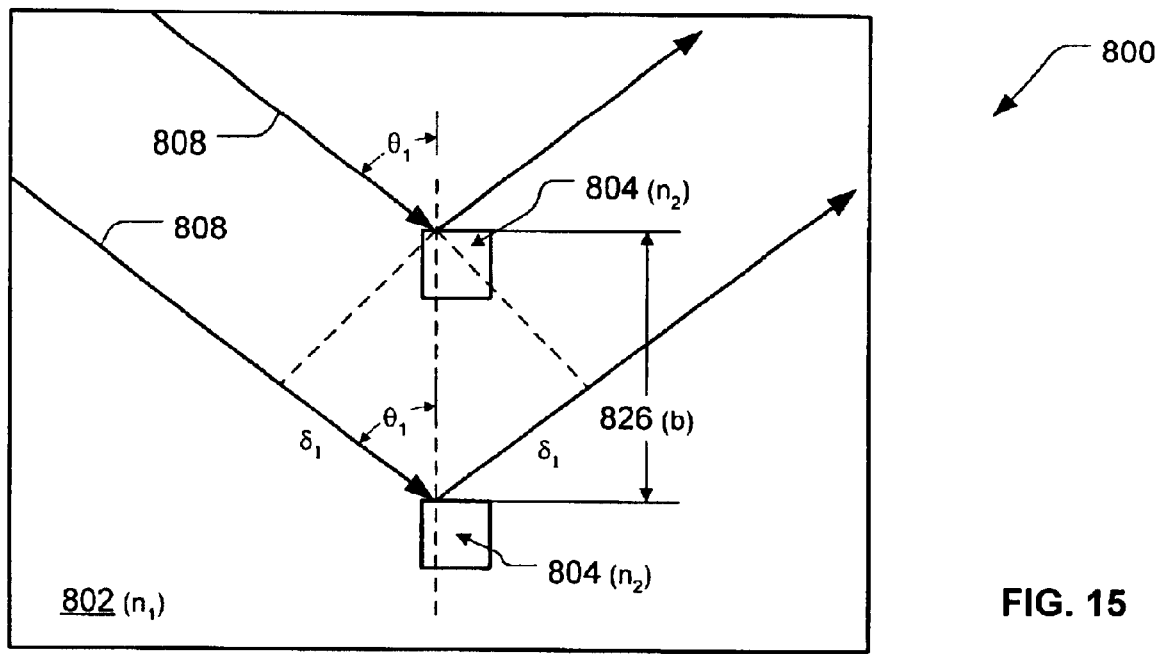
FIG. 15 is a schematic representation of cell-to-cell interference between two vertically adjacent cells in a grating.
Figure 16:
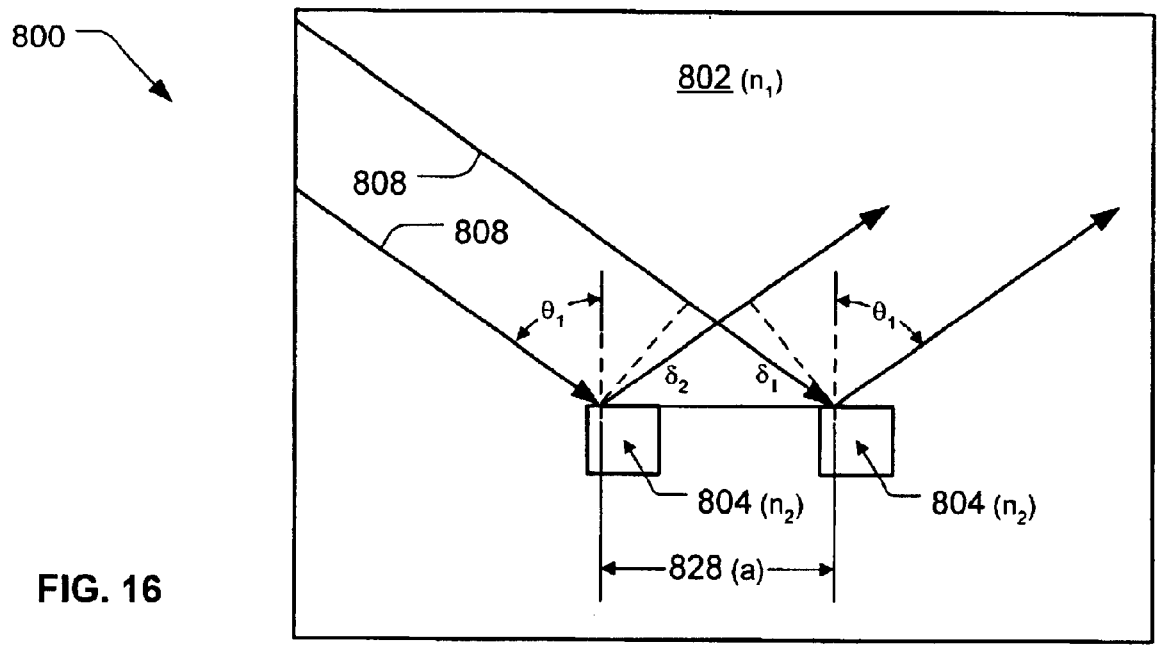
FIG. 16 is a schematic representation of cell-to-cell interference between two horizontally adjacent cells in a grating.

On the other hand, there also exists the possibility of cell-to-cell interference. In order to employ this to also achieve constructive interference between adjacent cells, certain conditions also have to be met. FIG. 15 depicts cell-to-cell interference between two vertically adjacent cells, and FIG. 16 depicts cell-to-cell interference between two horizontally adjacent cells.

Turning first to FIG. 15, it depicts the generic grating 800, again, with the background 802, but now containing a lattice of two of the cells 804 which are vertically aligned. The reflected intensity will be maximum if the optical path difference ($OPD_v$) between the cells 804 meets the condition:

$$OPD_v = 2*\delta_1 = 2*n_1*b*\cos \theta_1 = m*\lambda,$$

where $\delta_1$ is the distance shown, b is a vertical separation 826 between the two adjacent cells, and m is an integer.

Turning next to FIG. 16, it similarly depicts the generic grating 800, only now with the background 802 containing a lattice of two of the cells 804 which are horizontally aligned. The reflected intensity here will be maximum if the optical path difference ($OPD_h$) between the cells 804 meets the condition:

$$OPD_h = \delta_1 - \delta_2 = 2*n_1*a*\sin \theta_1 = 1*\lambda,$$

where $\delta_1$ and $\delta_2$ are the distances shown, a is a horizontal separation 828 between the two adjacent cells, and 1 is an integer.

Figure 17:
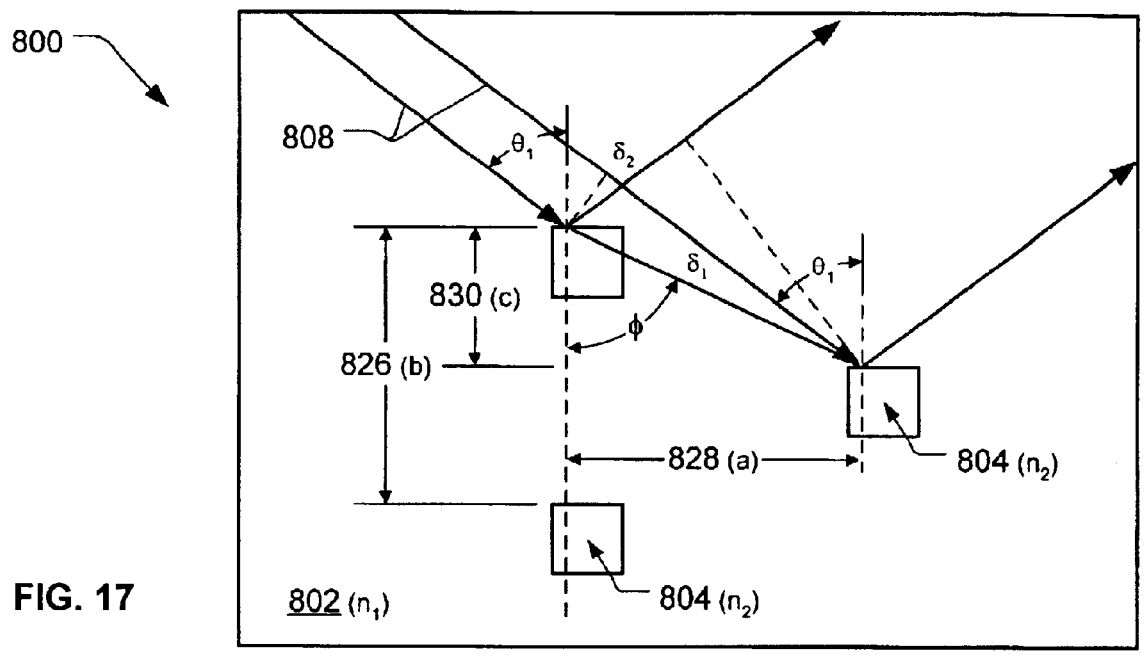
FIG. 17 is a schematic representation of general cell-to-cell interference, wherein a grating contains three cells two in adjacent columns.

FIG. 17 depicts a general case for cell-to-cell interference, wherein the generic grating 800 now contains three cells 804, in adjacent columns. The reflected intensity will be maximum if the optical path difference (OPD) between these cells 804 meets the condition:

$$OPD = \delta_1 - \delta_2 = 2*n_1*(a^2+c^2)^{1/2}*\cos(\phi-\theta_1) = m*\lambda, \quad \text{Eq. 2:}$$

where $\delta_1$ and $\delta_2$ are the distances shown, a is the horizontal separation 828 between two adjacent cells, b is the vertical separation 826 between the two adjacent cells, c=is a vertical separation 830 between two cells in adjacent columns, $\phi$ is the angle shown (essentially, a measure of cell-to-cell dis-alignment relative to the incidence surfaces), $\theta_1$ is the angle of light beam incidence, and m is an integer.

FIG. 18 depicts the general case of FIG. 17 extended to operate two dimensionally, on two wavelengths by using non symmetrical relationships in a grating 850. A background 852 (having refractive index $n_1$) here contains three cells 854 (having refractive index $n_2$). The cells 854 have a horizontal thickness 856 (x), a vertical thickness 858 (y), a horizontal separation 860 (a), a first vertical separation 862 (e), and a second vertical separation 864 (f). A light beam, stylistically represented as first portions 866 having a first wavelength $\lambda_1$ and second portions 868 having a second wavelength $\lambda_2$, approaches the cells 854. The first portions 866 are then scattered as shown if Eq. 2 is satisfied with respect to $\theta_1$. Similarly, the second portions 868) are scattered as shown if Eq. 2 is satisfied with respect to $\theta_2$.

FIG. 19 is a diagram of the grating 850 of FIG. 18 as it might typically be applied in an actual planar or cubical grating. Since the "pitch" of each grating cell-surface determines a "resonance" wavelength, by varying the pitch and the cell spacing in a two-dimensional grating an incoming multiple-wavelength laser beam can be sorted into single-wavelength beams in a spatial domain. Since the parameters of each individual grating unit can be made accurately with semiconductor-like manufacturing process, the directions of each single-wavelength laser beam can be made parallel, for use in ultimate applications.

FIG. 20 is a perspective view of a three-dimensional (3D) grating 880. In the grating 880 a background material (not shown, but of a material having refractive index $n_1$) contains non symmetrical cubic cells 882 (of a material having refractive index $n_2$). An incoming light beam including three wavelengths $\lambda_1$, $\lambda_2$, $\lambda_3$, stylistically represented as first portions 884, second portions 886, and third portions 888, is incident to the cells 882 on their surfaces. With respect to each of the three different incident surfaces and opposed surface sets, the cells 882 each behave like a "scatterer" according to Eq. 1 and 2, above.

Firstly, with respect to Eq. 1, the light wavelengths are each respectively scattered by a different set of opposite surfaces if:

$$2*n_2*d_i*\cos \theta_i = m_i*\lambda_i,$$

where $d_i$ is the respective cell thickness perpendicular to the "scattering" surface, $\theta_i$ is the respective refracted angle inside the cell, and $m_i$ is an integer respectively in each dimension. In fact, $\lambda_i$ can be viewed as the "inter-cell resonant wavelength" for opposite cell surfaces optically separated by $d_i$.

Secondly, with respect to Eq. 2, the light wavelengths are each respectively scattered by a different incident surface if:

$$OPD_i = 2*n_1*a_i*\cos(\phi_i - \theta_i) = m_i*\lambda_1,$$

where $OPD_i$ is the optical path difference between the cell-to-cell incident surfaces, $a_i$ is the cell-to-cell separation, $\phi_i$ is the angle of cell-to-cell dis-alignment (relative to the incidence surfaces), $\theta_i$ is the angle of light beam incidence to the incidence surfaces, and $m_i$ is an integer.

There are a number of factors which provide the gratings with novel abilities. These may be tailored individually or collectively, and the following, without limitation, now discusses some of these factors.

The background material's index of refraction ($n_1$) can be considered by itself. While many embodiments will intentionally keep this constant throughout the grating, it can also be controlled to craft sophisticated variations of the gratings. Using micro-fabrication techniques it is a simple matter to make different regions of the background material have different indices of refraction. Conceptually, this is can be viewed as constructing a number of contiguous gratings. It is useful to work with multiple light wavelengths in the gratings. More complex micro-fabrication techniques, however, also permit making all, or one or more parts, of the background material have indices of refraction which vary. For instance, a gradient can be imposed by controlled doping during grating fabrication. This permits constructing gratings that work with a range of light wavelengths (somewhat analogous in effect to conventional chirped gratings).

In multi-dimensional contexts such a gradient need not extend merely in a single-dimensional, lengthwise manner, like the light beam 510 progressing through the linear grating 500 in FIG. 11. For example, if the index of refraction were varied from, say, the top-left corner to the bottom-right corner in the linear grating 850 in FIG. 19, the first portions 866 ($\lambda_1$) and the second portions 868 ($\lambda_2$) would both contain broadened wavelength response (i.e., each be "chirped"). Similarly, if the index of refraction were varied from corner to corner in the cubical grating 880 of FIG. 20, the three respective portions 884, 886, 888 ($\lambda_1, \lambda_2, \lambda_3$) there would each be wavelength broadened.

Next the cell material's index of refraction ($n_2$) can be considered by itself. Again, sophisticated variations of the gratings can be constructed by working with the index of the material here. Constructing the cells using different single-index materials permits making gratings that work with multiple light wavelengths. Here that capability can be also particularly well integrated into the grating as a whole. FIG. 12 and the planar grating 600 depicted there can help illustrate this. The right-most cells 604 might have index $n_{2a}$, the middle-most cells have a different index $n_{2b}$, the left-most cells again have index $n_{2a}$, (and so forth in the many, many "layers" in most practical embodiments). The diffracted beam 618 will then contain two wavelengths, ($\lambda_a$, $\lambda_b$). Alternately, the cells 604 by index ($n_{2a}$, $n_{2b}$) can be arranged other than by layers. They can even be placed randomly. The ratio of cells 604 having index $n_{2a}$ to those having index $n_{2b}$ can also be varied, to "strongly" separate one wavelength (say, $\lambda_a$) and less completely extract the other ($\lambda_b$). Of course, the gratings are not limited to just cells having two indices ($n_{2a}$, $n_{2b}$); a third ($n_{2c}$), fourth ($n_{2d}$), etc. are possible as well. Similarly, once the concept is grasped for two-dimensions, it follows that it can be also be employed in three (consider FIG. 13 and the cubical grating 700 there).

Constructing the cells using internally varying material indices is also possible. This is another way to construct gratings that work with ranges of light wavelengths (again, somewhat analogous in effect to conventional chirped gratings, but here potentially with respect to each grating-dimension).

Next consider the background and cell material's indices of refraction together ($n_1$ and $n_2$). These two indices may be viewed as one factor, an "effective index" or "relative index" that effects the overall efficiency of the grating. Additionally, these indices can be worked with to facilitate construction. If one material (say, $n_2$) is hard to hold constant or to vary the characteristics of during grating fabrication, the other ($n_1$) can be worked with instead. It should also be noted that $n_1 < n_2$ or $n_1 > n_2$ can be used.

The surface-to-surface dimensions of the cells can also be considered. If the cells are made very small, comparable to the wavelength of the light source. Then the surface-to-surface dimensions are not a factor and Bragg's law can apply directly. Alternately, as has been shown above, the cells can be made larger. In this case, Bragg's law can still apply if one or more cell "thickness" is made so that the reflected waves constructively interfere.

As shown in FIGS. 14, 18, and 20, the cells can have one, two, or even three different thickness, to effect a corresponding number of light wavelengths differently. Furthermore, in sophisticated embodiments these respective cell thickness can intentionally be different. To help appreciate this further, reconsider the above discussion about varying cell index of refraction. Cell to cell variation can be employed. Finite sets or ranges of thicknesses for the different cells can be used; the cells so constructed can be placed in layers, another ordering, or randomly; and the proportions between the different cells can be equal or otherwise, to purposely work more or less strongly with particular light wavelengths.

The cell-to-cell spacings can likewise be considered. As shown in FIG. 15, the row-to-row placement of the cells can be controlled (to achieve uniformity or intentional forms of "non-uniformity," like the examples noted above). Similarly, as shown in FIG. 16, the column-to-column placement of the cells can be controlled (again for uniformity or intentional non-uniformity). Furthermore, however, as shown in FIG. 17, the cell-to-cell placement can be asymmetric. Either row-to-row asymmetry, column-to-column asymmetry, or both can be used. Still further, although semantically somewhat an oxymoron, this asymmetry can be uniform or non-uniform. For example, any or all of the separations 826, 828, 830 can be held constant or varied.

The cell quantity present is also a factor meriting consideration. If a large grating with may cells is cut into slices, Bragg's law holds for each. If only two rows, columns, etc. of cells are involved, the transition from constructive to destructive interference is quite gradual. In contrast, if many cells are present, the constructive interference will peak very sharply, with mostly destructive interference in between the peak wavelengths. In fact, this sharpening of the peaks is very similar to the sharpening of diffraction peaks from a diffraction grating as the number of slits increases. Of course, cutting large gratings to produce multiple smaller ones also has obvious manufacturing utility.

It should be noted that the examples in the figures herein have shown single gratings with no external components. In use there will, of course, be conventional external components such as a laser light source, and typically much more. Furthermore, in suitable applications considerable benefit can be obtained by using multiple gratings and other components together. One of the particular strengths of micro fabrication type processes, is that they can be used to construct large numbers and varieties of components concurrently. Such products can then be used either in operational combination or separately. Thus, for example, multiple linear gratings 500, planar gratings 600, or cubical gratings 700 can be constructed together in a linear or other operational arrangement, using different lattice dimensions, doping, etc. to work with different light wavelengths. If desired, other electrical and micro-mechanical components can also be constructed in the same substrate or in the same layer materials, e.g., one or more electro-optical sensors or micro mirrors. The gratings are thus very highly integrate-able with IC and MEMS technology.

Figure 21:
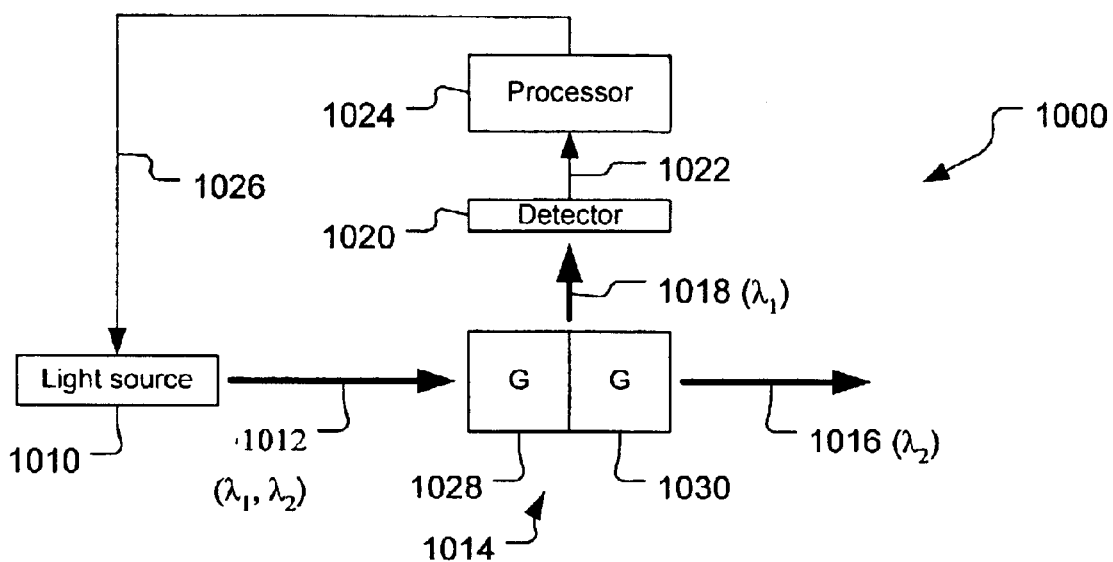
FIG. 21 is a schematic representation of a frequency detection, tuning or stabilization system (collectively a "frequency processing system") according to the present invention.

FIG. 21 is a schematic depiction of a frequency detection, tuning or stabilization system according to the present invention, hereinafter the "frequency processing system 1000." A light source 1010 produces a light beam 1012 which is received by a grating block 1014. The grating block 1014 then may produce either or both of a passed beam 1016 and a diffracted beam 1018. The diffracted beam 1018 is received by a detector 1020, which provides a measurement signal 1022 that is received by a processing circuit 1024. Finally, the processing circuit 1024 may provide a control signal 1026 to the light source 1010.

If the frequency processing system 1000 is used for frequency detection, the light source 1010 and the light beam 1012 are not, per se, required by the invention and the control signal 1026 is optional. In contrast, if the frequency processing system 1000 is used for frequency tuning or stabilization, the light source 1010, light beam 1012, and control signal 1026 are conceptually part of the overall invention.

The light source 1010 can be conventional in nature. It produces the light beam 1012 with a wavelength component of interest, and optionally also with one or more wavelength components which are not of interest. The component of interest is herein referred to as $\lambda_1$ and all other components are simply $\lambda_2$.

The light source 1010 may generate the light beam 1012 at a location potentially quite removed from the rest of the frequency processing system 1000, and then does not require conventional optics (not shown) to deliver the light beam 1012 to the grating block 1014.

The grating block 1014 in this embodiment of the invention includes a first grating 1028 and a second grating 1030. These may be either planar or cubical gratings, the nature of which is described elsewhere herein. The gratings 1028, 1030 are provided with somewhat different diffractive characteristics, but with both based on the component of interest ($\lambda_1$) in the light beam 1012.

The detector 1020 is a position sensitive type aligned with respect to the grating block 1014 to sense where the diffracted beam 1018 exits. As will be described presently, where the diffracted beam 1018 exits the grating block 1014 is determined by selection of the diffractive characteristics of the gratings 1028, 1030 and by the actual frequency of the component of interest. The gratings 1028, 1030 will, of course, have relatively fixed characteristics. In contrast the frequency of the component of interest in the light beam 1012 may drift (i.e., become $\lambda_1 \pm \Delta$). FIG. 21 depicts a arrangement where the detector 1020 may be a common bi-cell type producing the measurement signal 1022 as two voltages that are differentially combined in an early stage of the processing circuit 1024.

The processing circuit 1024 is constructed based on the role of the frequency processing system 1000. If frequency detection is all that is desired, it can simply report on the frequency of the component of interest in the light beam 1012. If frequency tuning is desired, the processing circuit 1024 can instead or additionally generate the control signal 1026 to adjust the light source 1010 as needed. And if frequency stabilization is desired is desired, the processing circuit 1024 can provide ongoing feedback (servo control) to keep the light source 1010 consistently producing the component of interest specifically at the desired frequency.

FIGS. 22A–D are graphs depicting wavelength verses intensity in the diffracted beam 1018 for a few possible scenarios in the frequency processing system 1000 of FIG. 21. In these figures, points 1050*a–g* represent specific light wavelengths on the graph.

Figure 22A:
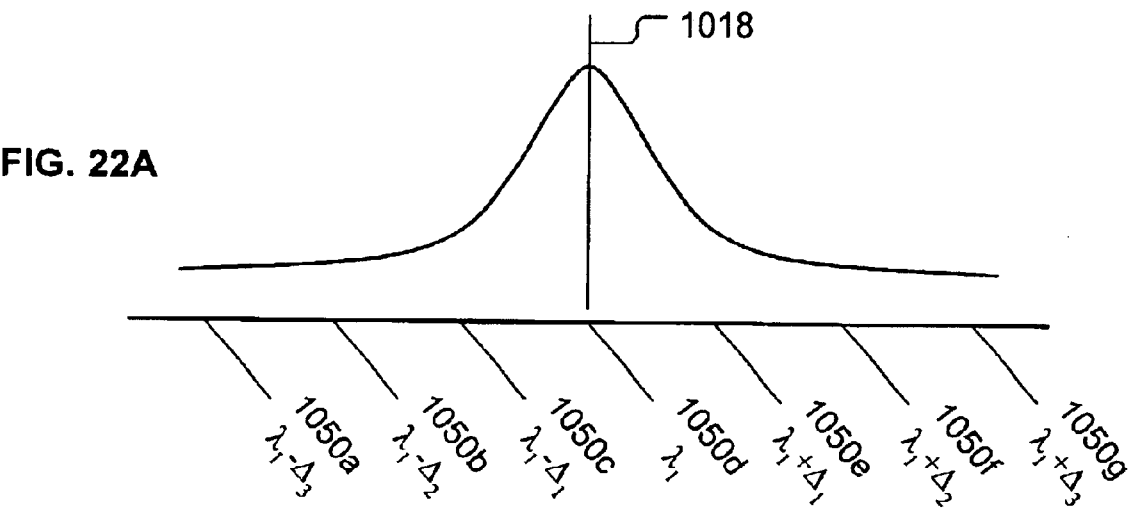

FIG. 22A represents an optimal situation. The intensity peak is at point 1050*d*, which indicates that the component of interest in the light beam 1012 is at the desired frequency or wavelength ($\lambda_1$).

The first grating 1028 may have diffractive characteristics chosen to specifically match point 1050*d* ($\lambda_1$) and the second grating 1030 to match point 1050*e* ($\lambda_1 + \Delta_1$). Lets term this case one. In case one the grating block 1014 will receive the light beam 1012 ($\lambda_1$, $\lambda_2$) and simply permit the light components not of interest ($\lambda_2$) to pass through and exit as the passed beam 1016. More of importantly, however, the grating block 1014 will also diffractively redirect the component of interest in the light beam 1012 as the diffracted beam 1018. Here that will primarily exit from the first grating 1028, since it responds specifically to ($\lambda_1$, point 1050*d*), but a smaller portion will also exit from the second grating 1030, since it responds at $\lambda_1 + \Delta_1$ (point 1050*e*).

The gratings 1028, 1030 may be chosen with other diffractive characteristics. For example, in a case two, the first grating 1028 may match point 1050*c* ($\lambda_1 - \Delta_1$) and the second grating 1030 to match point 1050*d* ($\lambda_1$). A case three will be more typical, though, where the first grating 1028 is selected to match point 1050*c* ($\lambda_1 - \Delta_1$) and the second grating 1030 to match point 1050*e* ($\lambda_1 + \Delta_1$).

Figure 22B:
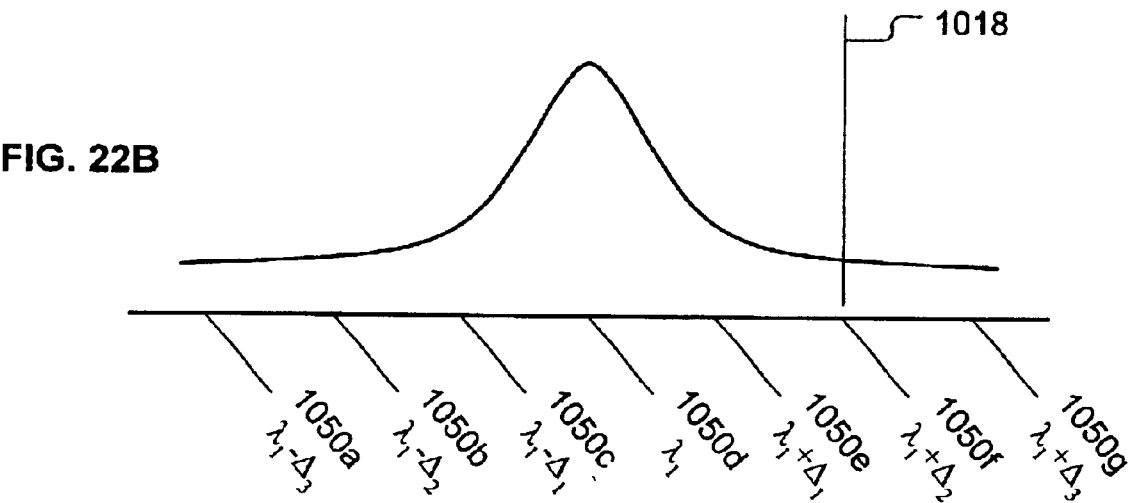

FIG. 22B represents a non optimal situation, where the frequency of the component of interest in the light beam 1012 has drifted upward to such an extent that the intensity peak is now at point 1050*f* ($\lambda_1 + \Delta_2$). If the gratings 1028, 1030 are chosen according to case one (points 1050*d*, 1050*e*, respectively), the diffracted beam 1018 will exit in a small portion from the first grating 1028 and in a larger portion from the second grating 1030. If the gratings 1028, 1030 are chosen according to case two (points 1050*c*, 1050*d*), the diffracted beam 1018 will exit in a very small portion from the first grating 1028 and in a slightly larger portion from the second grating 1030. In fact, the voltages in the measurement signal 1022 may be so close in value that the processing circuit 1024 has trouble determining whether the component of interest in the light beam 1012 is above of below the desired frequency or wavelength ($\lambda_1$). This is why the gratings 1028, 1030 often will be chosen according to case three. Under case three (points 1050*c*, 1050*e*), the diffracted beam 1018 will exit in very small portion from the first grating 1028 and in a substantially larger portion from the second grating 1030. The measurement signal 1022 will represent this and the processing circuit 1024 should have no trouble determining that upward drift has occurred.

Figure 22C:
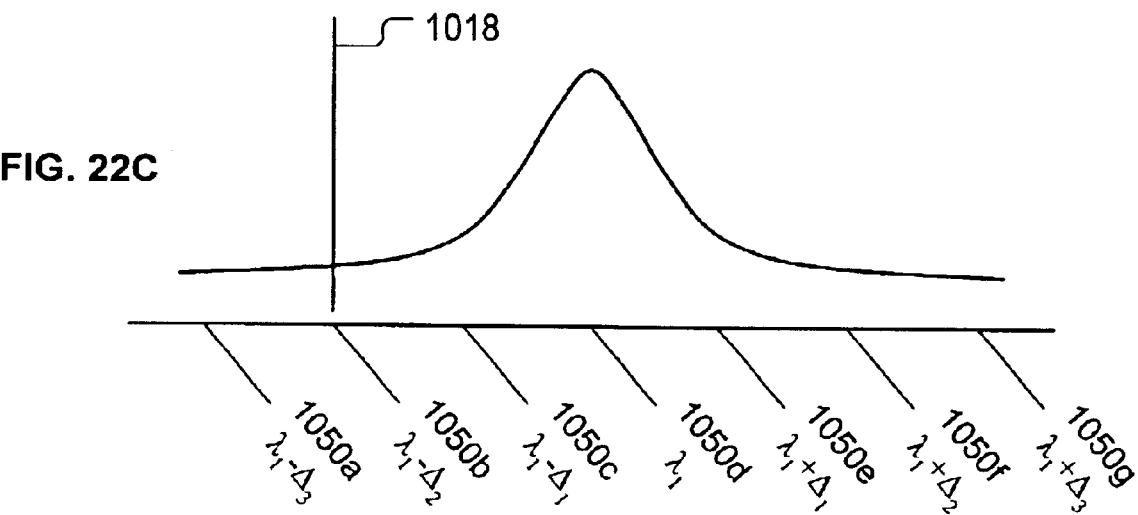
Figure 22D:
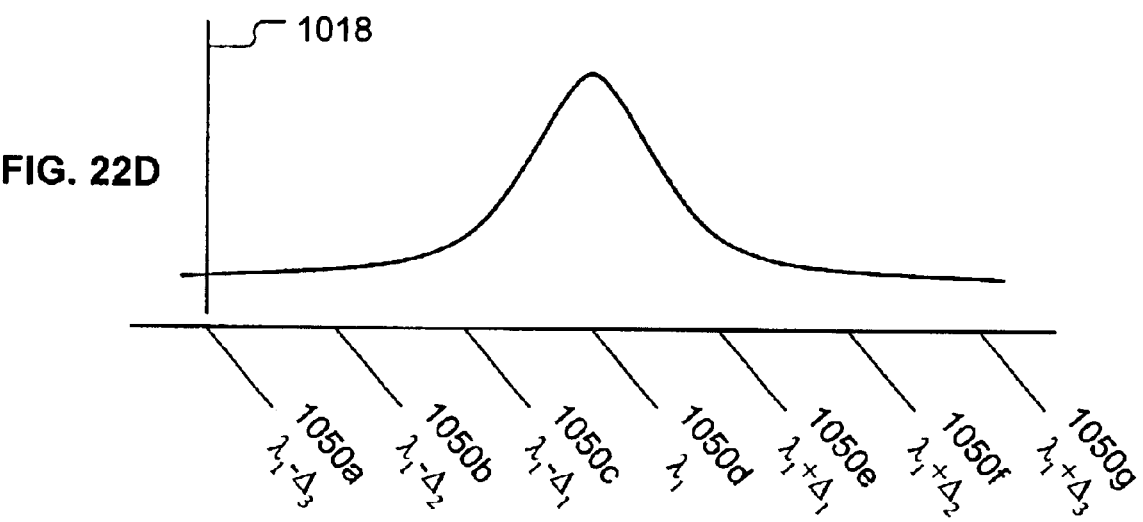

FIG. 22C represents the non optimal situation which is the downward drift converse of the situation in FIG. 22B. What happens for the various gratings 1028, 1030 selection cases under in FIG. 22C should be clear. Finally, FIG. 22D represents an extreme non optimal situation, one that may be beyond the capabilities of the frequency processing system 1000.

Figure 23:
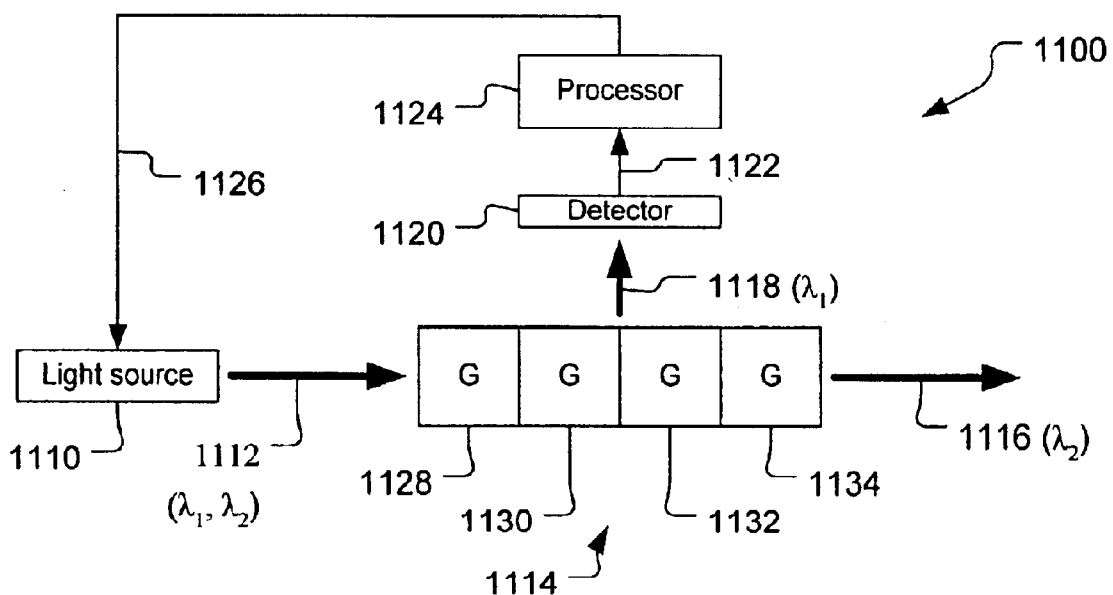
FIG. 23 is a schematic representation of a frequency processing system employing additional gratings in the grating block.

FIG. 23 is a schematic depiction of a somewhat more sophisticated embodiment of the present frequency detection, tuning and stabilization invention, a "frequency processing system 1100." Here a light source 1110 produces a light beam 1112 which is received by a grating block 1114 that may produce either or both of a passed beam 1116 and a diffracted beam 1118. A detector 1120 receives the diffracted beam 1118 and provides a measurement signal 1122 to a processing circuit 1124. The processing circuit 1124, in turn, may provide a control signal 1126 to the light source 1110.

The light source 1110 here may be the same as the light source 1010 in FIG. 21; the light beam 1112 may be the same as the light beam 1012, including $\lambda_1$ and $\lambda_2$; the passed beam 1116 may effectively be the same as the passed beam 1016, including $\lambda_2$; and the control signal 1126 may even have the same nature as the control signal 1026.

As shown, however, the grating block 1114 here includes four gratings 1128, 1130, 1132, 1134. These gratings 1128, 1130, 1132, 1134 are provided with diffractive characteristics respective to the light wavelength desired in the component of interest ($\lambda_1$) in the light beam 1112.

The detector 1120 here is also a position sensitive type aligned with respect to the grating block 1114, but it will typically (but not necessarily) be more complex than the simple bi-cell type used for the detector 1120. A linear cell array might be used, for instance. Similarly, the measurement signal 1122 here will typically be more complex, to represent the output of this detector 1120.

The processing circuit 1124 here is typically more complex as well, but in a straightforward manner, and, as noted, the control signal 1126 which it provides may be the very same as the control signal 1026 in FIG. 21.

With reference again to the graphs in FIGS. 22A–D and to points 1050a–g, more complex cases can now be handled. For instance, consider a case four where the gratings 1128, 1130, 1132, 1134 respectively have diffractive characteristics coinciding with the points 1050b, 1050c, 1050e, 1050f.

FIG. 22A still represents the optimal situation, where the intensity peak of the component of interest in the light beam 1012 is at the desired frequency or wavelength ($\lambda_1$) (i.e., at point 1050d). Here a small portion of the diffracted beam 1118 will exit from grating 1128; a larger port will exit from grating 1130; a portion nominally equaling that exiting grating 1130 will exit from grating 1132; and a portion nominally equaling that exiting grating 1128 will exit from grating 1134.

FIG. 22B represents another a non optimal situation, where the frequency of the component of interest in the light beam 1110 has drifted upward to where the intensity peak is now at point 1050f ($\lambda_1 + \Delta_2$). Here a very small portion of the diffracted beam 1118 will exit from grating 1128 (point 1050b). A larger portion will exit from grating 1130 (point 1050c), but his may be so marginally larger that the difference between it and the portion from grating 1128 are indistinguishable in the measurement signal 1122. A notably larger portion will exit from grating 1132 (point 1050e), however, and a still larger portion will exit from grating 1134 (point 1050f, coinciding with the intensity peak here). The processing system should have no problem determining that upward drift has occurred, or further calculating the amount of that drift.

FIG. 22C again represents the converse of FIG. 22B, and what will happen here should again be clear. FIG. 22D, however, deserves further consideration now that the frequency processing system 1100 is being used. Continuing with selection of the gratings 1128, 1130, 1132, 1134 according to case four, a notable portion of the diffracted beam 1118 will exit from grating 1128 (point 1050b). A lesser, nominal, portion will exit from grating 1130 (point 1050c). The portions exiting from gratings 1132, 1134 (points 1050e, 1050f) will be quite small, probably indistinguishable from each other and possibly not even distinguishable from the portion exiting grating 1130. The salient point, though, is that the frequency processing system 1100 here can at least determine that downward drift is what has occurred, whereas the frequency processing system 1000 could not be relied on for this.

Figure 24:
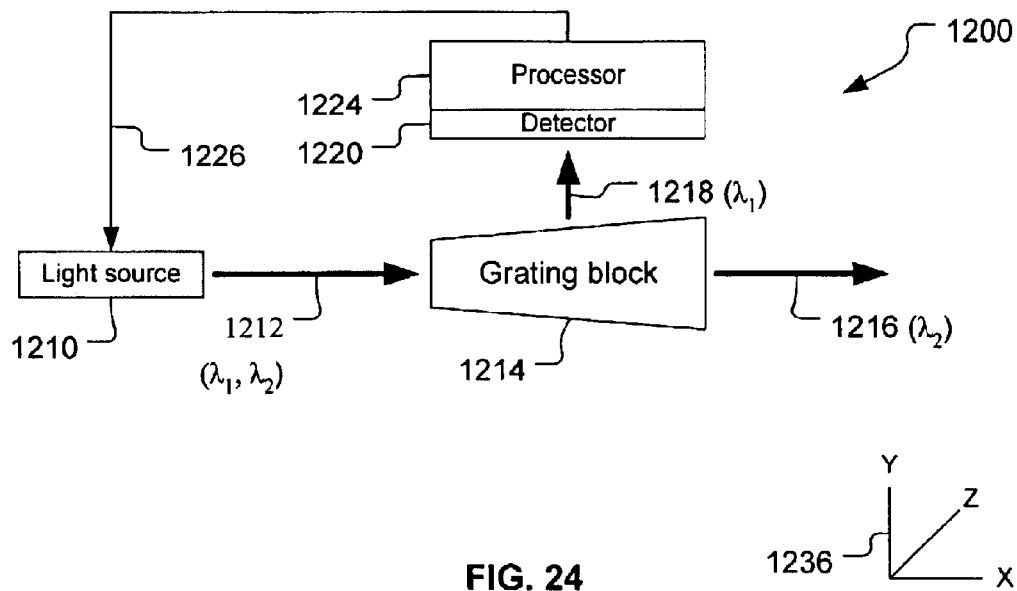
FIG. 24 is a schematic representation of a frequency processing system employing a grating block having gradient-varied characteristics.

FIG. 24 is a schematic depiction of another embodiment of the frequency detection, tuning and stabilization invention, here a "frequency processing system 1200." This embodiment takes the grating element to a logical extension of the concept of the frequency processing systems 1000, 1100 by using sophisticated embodiments of planar or cubical gratings.

A light source 1210 produces a light beam 1212 which is received by a grating block 1214 that may produce either or both of a passed beam 1216 and a diffracted beam 1218. A detector 1220 receives the diffracted beam 1218 and provides a measurement signal 1222 to a processing circuit 1224. The processing circuit 1224, in turn, may provide a control signal 1226 to the light source 1210. The light source 1210 here may be the same as the light sources 1010, 1110; the light beam 1212 may be the same as the light beams 1012, 1112 ($\lambda_1$, $\lambda_2$); the passed beam 1216 may effectively be the same as the passed beams 1016, 1116 ($\lambda_2$); and the control signal 1226 may also be the same in nature as the control signals 1026, 1126.

Rather than containing multiple gratings, such as gratings 1028, 1030 or gratings 1128, 1130, 1132, 1134, the grating block 1214 here is a single unit having a gradient extending lengthwise (i.e., along the x-axis, as depicted by a XYZ-axes icon 1236). The diffractive characteristics of the grating block 1214 vary along this gradient, and this has been represented in a stylized manner in FIG. 24 by showing the grating block 1214 as trapezoidal in shape. The gradient variation could just as easily be opposite, i.e. rather than having the light beam 1212 enter the "small" end having it enter the "large" end and proceed to the smaller end. In actual practice the grating block 1214 also need not be physically trapezoidal at all, and in some embodiments having it this shape may even be undesirable. As has discussed extensively elsewhere herein, a number of attributes in either planar or cubical gratings can be manufactured to produce such a gradient. Some of these, applied in the present context, are discussed with FIGS. 25A–I, presently.

The diffracted beam 1218 will exit the grating block 1214 based on its diffraction characteristics and where the where the component of interest in the light beam 1212 is with respect to the desired wavelength ($\lambda_1$). For example, the grating block 1214 may be provided to diffract the range of wavelengths $\lambda_1 \pm \Delta$. Other arrangements are suitable, but the component of interest in the light beam 1212 generally needs to be within the wavelength range of the grating block 1214 or sufficient close to it that measurable diffraction occurs (i.e., that essentially all of the light beam 1212 does not merely exit as the passed beam 1216). Although a matter of design choice, for most applications the preferable choice will be to have the grating block 1214 responsive to $\lambda_1 \pm \Delta$.

The detector 1220, measurement signal 1222, processing circuit 1224, and control signal 1226 are all conceptually equivalent the respectively similar elements in FIG. 21 and FIG. 23. The processing circuit 1224 has, however, been moved adjacent to the detector 1220 here, and the measurement signal 1222 made internal to this grouping, to emphasize that embodiments of the present invention can be highly integrated. For that matter, as has also been discussed elsewhere herein, all of the components may be integrated by using appropriate semiconductor-like fabrication techniques.

Figure 25A:
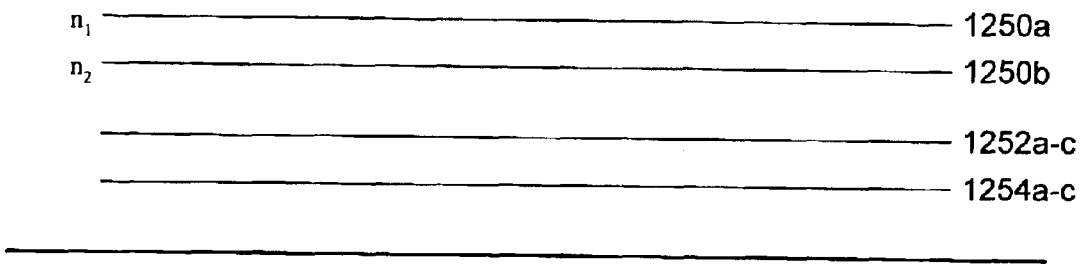

FIGS. 25A–I are graphs depicting some possible gradients, as might be used in the grating blocks 1014, 1114, 1214 in FIGS. 21, 22 and 24. FIG. 25A depicts the basic case, as might be present in the individual gratings 1028, 1030, 1128, 1130, 1132, 1134. A line 1250a represents the refractive index $n_1$ of the background material, and a second line 1250b represents the refractive index $n_2$ of the cell material. [Additional lines could be used to represent cells having multiple, discrete refractive indices $n_3$, $n_4$, etc.] These lines 1250a–b are both horizontal here, indicating that the refractive indices are constant, and these two lines 1250*a–b* are separated because $n_1$ is not equal to $n_2$. Note, while $n_1 > n_2$ is shown, there is no reason that $n_1 < n_2$ could not instead be the case. If so line 1250*b* would be drawn above line 1250*a*.

FIG. 25A further includes a visible line that is actually three overlying lines 1252*a–c* which represent the possible cell-to-cell separations in a cubical grating. Similarly, one visible line here is actually three overlying lines 1254*a–c* representing possible surface-to-surface separations in a cubical grating. For a planar grating, the lines 1252*c*, 1254*c* would not be present. The lines 1252*a–c* and lines 1254*a–c* are also all horizontal here, indicating that the respective dimensions they represent are constant here. In sum, there is no gradient in FIG. 25A.

Figure 25B:
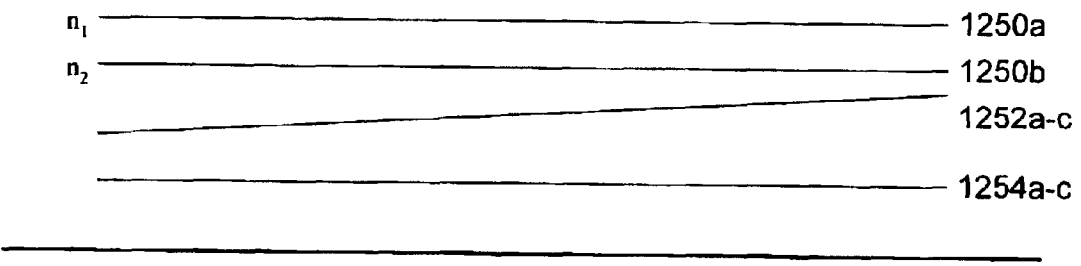
Figure 25C:
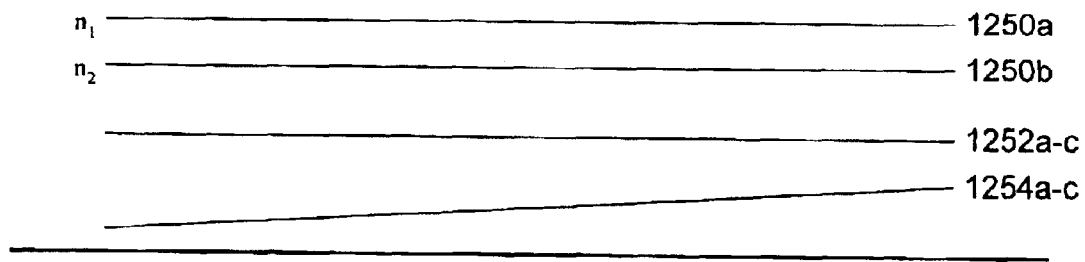
Figure 25D:
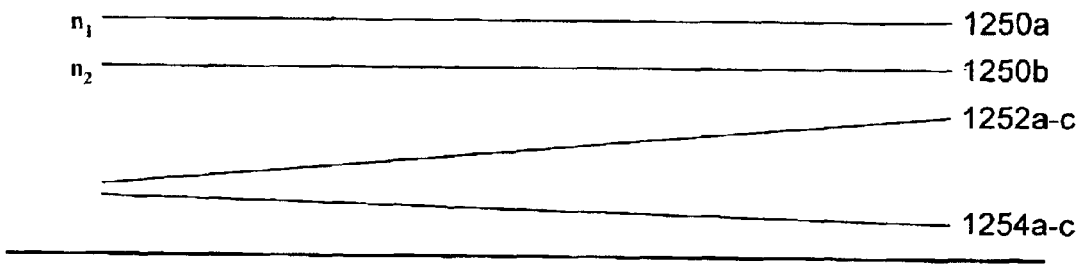

FIG. 25B depicts a simple gradient case, one where the lines 1252*a–c* for cell-to-cell separations change along the optical path "seen" by a light beam. FIG. 25C depicts a similar gradient case, but one where the lines 1254*a–c* for surface-to-surface separations change instead. FIG. 25D depicts one combination of the concepts represented in FIG. 25B–C. Other variations on such combination are obvious.

Figure 25E:
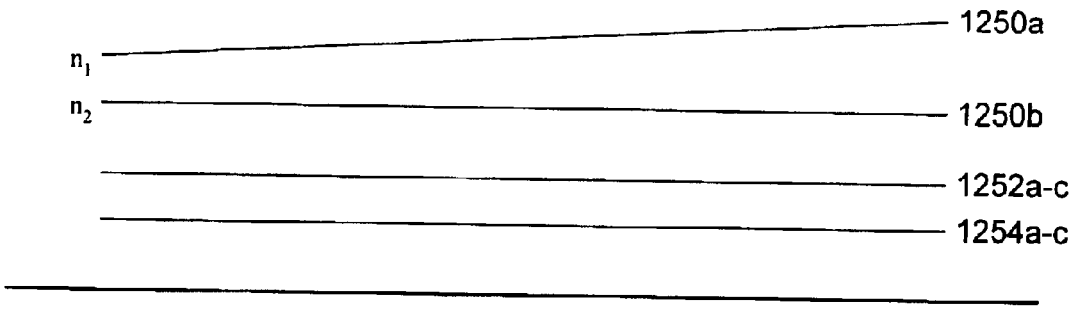
Figure 25F:
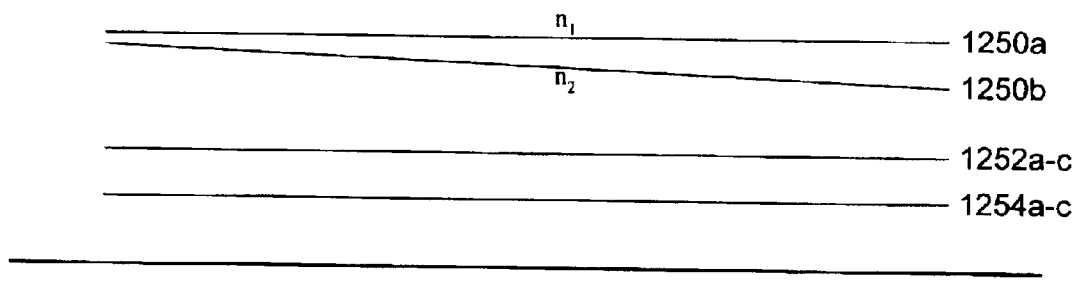
Figure 25G:
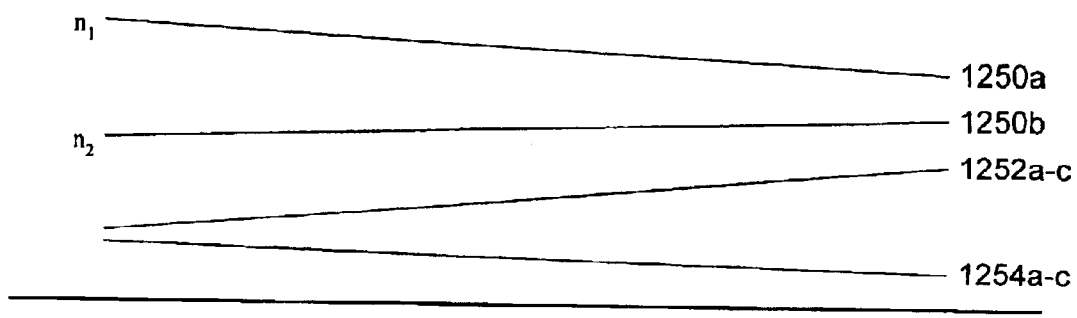

FIG. 25E depicts another simple gradient case, albeit one that may seem somewhat odd, particularly to those familiar with semiconductor-type manufacturing processes where varying physical dimensions is common and varying refractive index is not. Intentionally varying the refractive index, however, is also possible using such processes and this a perfectly valid way to construct suitable gradients. FIG. 25F depicts a similar gradient case, and FIG. 25G depicts one possible combination based on the concepts underlying FIGS. 25E–F.

Figure 26:
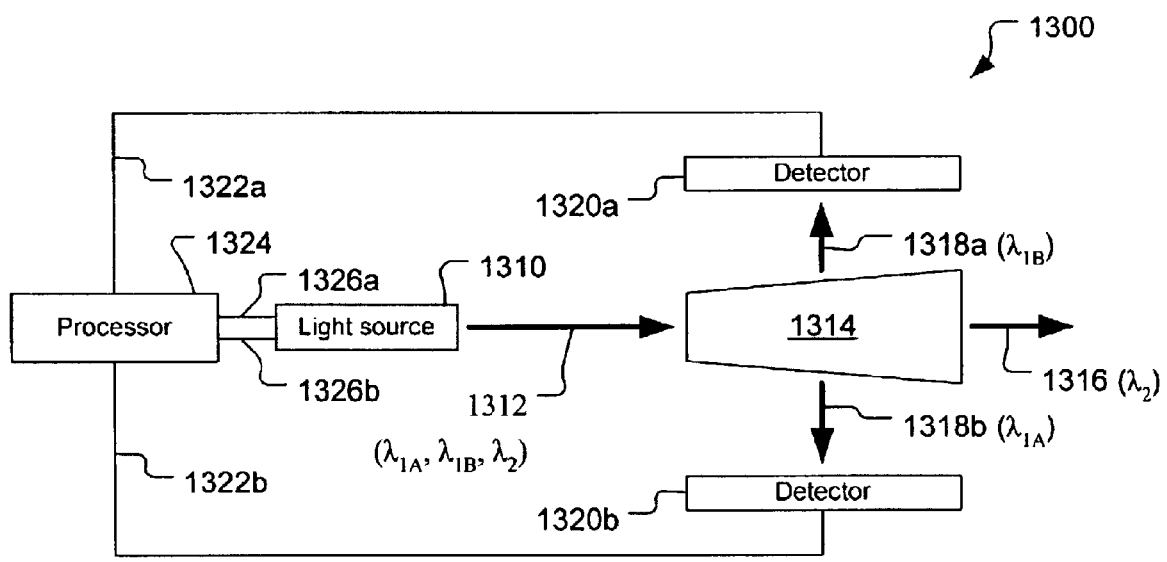
FIG. 26 is a schematic representation of a frequency processing system employing multiple concurrent wavelength characteristics in planar or cubical gratings.
Figure 25H:
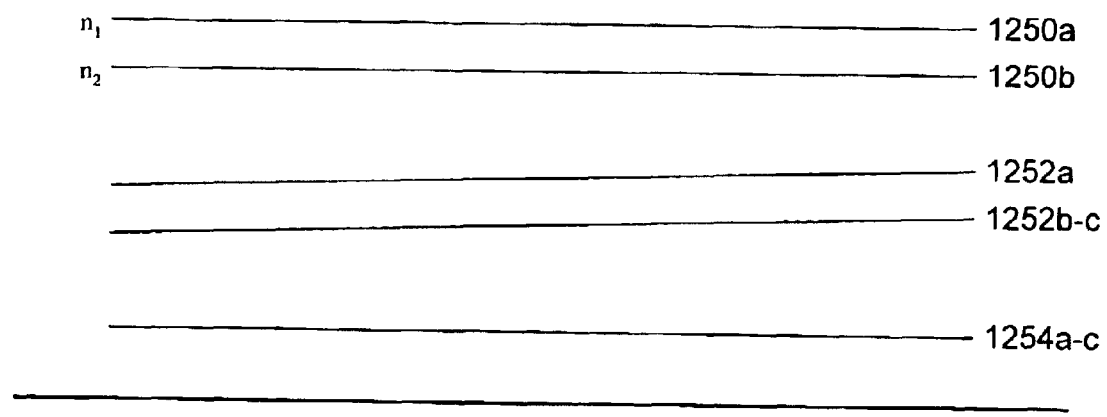
Figure 25I:
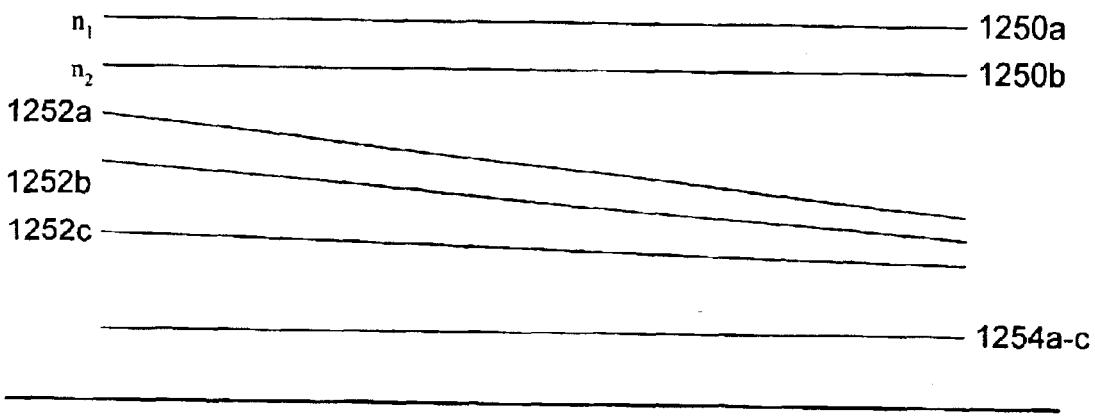

FIG. 25H depicts a more sophisticated gradient case, such as might be used in the embodiment represented by FIG. 26, discussed presently. And FIG. 25I depicts an even more complex case. Varying cell-to-cell dimensions have been used in these examples, and thus lines 1252*a–c* slope, but surface-to-surface variation might instead or additionally be used, and then lines 1252*a–c* would instead or additionally slope.

Many complex combinations of such variations are possible. Therefore, a key point to be noted is that the present invention can use a grating component that can be very flexibly manufactured. The cell-to-cell separations, the intra-cell surface-to-surface separations, the background material refractive index, and the cell material refractive index can all be held constant or varied as desired to achieve desired diffractive characteristics. Concurrently this can be done for one, or two sets of such parameters in planar gratings and one, two, or three sets in cubical gratings.

Finally, FIG. 26 is schematic depiction of another embodiment of the frequency detection, tuning and stabilization invention, here a "frequency processing system 1300." This embodiment employs the non symmetrical frequency response relationships that are possible in planar or cubical gratings.

A light source 1310 produces a light beam 1312 having two wavelengths of interest, $\lambda_{1A}$, $\lambda_{1B}$. The light beam 1312 may also other wavelengths not of interest, collectively 2. The light beam 1312 is received by a grating block 1314 that may produce any or all of a passed beam 1316 ($\lambda_2$), a first diffracted beam 1318*a* ($\lambda_{1A}$), and a second diffracted beam 1318*b* ($\lambda_{1B}$). A first detector 1320*a* receives the first diffracted beam 1318*a* ($\lambda_{1A}$) and provides a first measurement signal 1322*a* to a processing circuit 1324. A second detector 1320*b* receives the second diffracted beam 1318*b* ($\lambda_{1B}$) and provides a second measurement signal 1322*b* to the processing circuit 1324.

The processing circuit 1324 then provides a first control signal 1326*a* and a second control signal 1326*b* to the light source 1310.

It follows that one-, two-, or three-channel embodiments of the inventive frequency detection, tuning and stabilization system are possible using non symmetrical type gratings. A single grating block core can handle up to three distinct wavelengths ($\lambda_{1A}$, $\lambda_{1B}$, $\lambda_{1C}$) present in a light beam, and subject them to separation into respective diffracted beams usable for frequency detection, tuning or stabilization. Concurrently, one or more other wavelengths ($\lambda_2$) can also be present and simply passed. Furthermore, the multiple or single core grating blocks used for this may range in internal complexity as needed or as desired, as has been partially demonstrated by the necessarily limited range of examples in the figures.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present invention is well suited for application in processing the frequency of a light beam to detect its frequency, to tune a light source producing the light beam so that a desired frequency is produced, or to stabilize the frequency of the light beam as it is produced.

The inventive frequency processing system 1000, 1100, 1200, 1300 may use a grating block of symmetrical or non-symmetrical planar or cubical gratings. The grating block emits none, one, or more diffracted beams, and none or one passed beam as well. The position where the diffracted beam, or positions where the diffracted beams, exit the grating block particularly depend upon the characteristics of the gratings and the frequencies present in the light beam based. This position, or the relative intensity at different positions, is then detectable and possible to provide the noted benefits of frequency detection, tuning, and stabilization.

The inventive frequency processing system 1000, 1100, 1200, 1300 may also be constructed using widely known and established semiconductor-like fabrication techniques and materials. This alone permits the invention to be produced and employed economically. Furthermore, however, this also permits integration of any or all of the light source, grating, detector, and processor elements into one assembly. Such an assembly may be highly compact and robust and these factors, alone or in combination with the ability of non-symmetrical gratings to handle multiple frequencies concurrently, permit the invention to fill many roles which have heretofore gone wanting.

For the above, and other reasons, it is expected that the process and products of the present invention will have widespread industrial applicability. Therefore, it is expected that the commercial utility of the present invention will be extensive and long lasting.

What is claimed is:

1. A system for processing the frequency of a light beam produced by a light source, comprising:

a grating block able to receive the light beam and emit a diffracted beam having a position based on the frequency of the light beam, wherein said grating block includes at least one grating element of planar or cubical type;

a grating block able to receive the light beam and emit a diffracted beam having a position based on the frequency of the light beam, wherein said grating block includes at least one grating element of planar type or cubical type, wherein a grating element of planar type provides interference in two dimensions and a grating element of cubical type provides interference in three dimensions;

a detector able to receive said diffracted beam and based on its said position provide a measurement signal; and a processor able to receive said measurement signal and determine the frequency of the light beam there from, thereby detecting the frequency or wavelength of the light beam.

2. The system of claim 1, wherein said grating block includes at least two said grating elements having different frequency response characteristics, thereby causing said grating element to proportionally emit greater or lesser amounts of said diffracted beam.

3. The system of claim 1, wherein said grating block includes a said grating element having gradient frequency response characteristics, thereby causing said grating element to emit a greatest proportion of said diffracted beam at one location.

4. The system of claim 1, wherein said detector includes a bi-cell type photodetector.

5. The system of claim 1, wherein said detector includes a photodiode array.

6. The system of claim 1, wherein:

the light source is able to adjust the frequency of the light beam responsive to a control signal; and said processor is further able to produce said control signal based on the frequency of the light beam determined from said measurement signal and communicate said control signal to the light source, thereby permitting tuning of the frequency or wavelength of the light beam.

7. The system of claim 6, wherein said processor is further able to produce said control signal based on the frequency of the light beam over a period of time, thereby permitting stabilizing the frequency or wavelength of the light beam.

8. The system of claim 1, wherein:

said grating block has non symmetrical frequency response relationships to emit a plurality of said diffracted beams having respective said positions based on a plurality of frequencies of the light beam;

a plurality of said detectors are provided, like in number to said plurality of said diffracted beams, each able to receive one said diffracted beam and based on its said position provide a respective said measurement signal; and said processor is able to receive said measurement signals and determine the frequencies of the light beam there from.

9. The system of claim 1, wherein:

said grating block includes at least one planar or cubical type grating element having two said non symmetrical frequency response relationships;

two said detectors are provided, each able to receive a said diffracted beam and provide a said measurement signal; and said processor is able to receive said measurement signals and determine two frequencies of the light beam there from.

10. The system of claim 1, wherein:

said grating block includes at least one cubical type grating element having three said non symmetrical frequency response relationships;

three said detectors are provided, each able to receive a said diffracted beam and provide a said measurement signal; and said processor is able to receive said measurement signals and determine three frequencies of the light beam there from.

11. The system of claim 1, wherein said grating block has at least one chirped frequency response relationship to emit said diffracted beam having a broadened said position based on a range of frequencies of the light beam.

12. The system of claim 1, wherein at least two members of the set consisting of said grating block, said detector, and said processor are physically integrated.

13. The system of claim 1, wherein said members are constructed using semiconductor-like fabrication techniques.

14. A method for processing the frequency of a light beam produced by a light source, comprising the steps of:

(a) receiving the light beam into a grating block including at least one grating element of planar or cubical type, wherein a grating element of planar type provides interference in two dimensions and a grating element of cubical type provides interference in three dimensions;

(b) emitting from said grating block a diffracted beam at a position based on the frequency of the light beam;

(c) detecting said position of said diffracted beam and providing a measurement signal based there on; and (d) processing said measurement signal to determine the frequency of the light beam there from, thereby detecting the frequency or wavelength of the light beam.

15. The method of claim 14, wherein said step (b) includes proportionally emitting said diffracted beam from a plurality of said grating elements at a broadened said position based on different frequency response characteristics of said grating elements.

16. The method of claim 14, wherein said step (b) includes proportionally emitting said diffracted beam from said grating block at a broadened said position based on a gradient frequency response characteristic of said grating block.

17. The method of claim 14, further comprising:

(e) producing a control signal based on the frequency of the light beam determined in said step (d);

(f) communicating said control signal to the light source; and (e) adjusting the frequency of the light beam responsive to said control signal, thereby permitting tuning of the frequency or wavelength of the light beam.

18. The method of claim 17, wherein said step (e) further includes producing said control signal based on the current frequency of the light beam determined in said step (d) and also on the frequency of the light beam over a period of time, thereby permitting stabilizing the frequency or wavelength of the light beam.

19. The method of claim 14, wherein:

said step (b) includes emitting a plurality of said diffracted beams at respective said positions based on a plurality of frequencies of the light beam and non symmetrical frequency response relationships in said grating block;

said step (c) includes detecting said position of each said diffracted beam and providing a measurement signal based there on;

said step (d) includes processing said measurement signals and determining the frequencies of the light beam there from.

20. The method of claim 14, wherein said step (b) includes emitting said diffracted beams based on a chirped frequency response relationship in said grating block, thereby processing the frequency of the light beam based on a range of frequencies present there in.

21. A system for processing the frequency of a light beam produced by a light source, comprising:

grating means for receiving the light beam and emitting a diffracted beam having position based on the frequency of the light beam, wherein said grating means includes at least one grating element of planar or cubical type, wherein a grating element of planar type provides interference in two dimensions and a grating element of cubical type provides interference in three dimensions;

detector mans for receiving said diffracted beam and based on its said position providing a measurement signal; and processor means for receiving said measurement signal and determining the frequency of the light beam there from, thereby detecting the frequency or wavelength of the light beam.

22. The system of claim 21, wherein said processor means is further for producing said control signal based on the frequency of the light beam over a period of time, thereby permitting stabilizing the frequency or wavelength of the light beam.

23. The system of claim 21, wherein:

said grating means is further for emitting a plurality of said diffracted beams having respective said positions for respective frequencies of the light beam, based on non symmetrical frequency response relationships;

said detector means includes a plurality of detection means, like in number to said plurality of said diffracted beams, for each receiving one said diffracted beam and based on its said position providing a respective said measurement signal; and said processor means is further for receiving said measurement signals and determining the frequencies of the light beam there from.

24. The system of claim 21, wherein said grating means includes means for chirping frequency response.

* * * * *